United States Patent
Raaj et al.

(10) Patent No.: US 12,454,065 B1
(45) Date of Patent: Oct. 28, 2025

(54) GENERATING OBJECT REFERENCES FROM PERCEPTION DATA IN UNSTRUCTURED ENVIRONMENTS AND RELATED TECHNOLOGY

(71) Applicant: Agility Robotics, Inc., Pittsburgh, PA (US)

(72) Inventors: Yaadhav Raaj, Beaverton, OR (US); Juan Fernando Medrano Yax, Guatemala (GT)

(73) Assignee: Agility Roboltics, Inc., Pittsburgh, PA (US)

( * ) Notice: Subject to any disclaimer, the term of this patent is extended or adjusted under 35 U.S.C. 154(b) by 163 days.

(21) Appl. No.: 18/507,590

(22) Filed: Nov. 13, 2023

Related U.S. Application Data

(60) Provisional application No. 63/589,578, filed on Oct. 11, 2023, provisional application No. 63/584,068, filed on Sep. 20, 2023.

(51) Int. Cl.
*B25J 13/08* (2006.01)
*B25J 9/00* (2006.01)
*B25J 9/16* (2006.01)
*B25J 19/02* (2006.01)
*G06F 18/23* (2023.01)
*G06T 7/73* (2017.01)

(52) U.S. Cl.
CPC .......... *B25J 13/089* (2013.01); *B25J 9/0006* (2013.01); *B25J 9/161* (2013.01); *B25J 9/163* (2013.01); *B25J 9/1697* (2013.01); *B25J 19/023* (2013.01); *G06F 18/23* (2023.01); *G06T 7/75* (2017.01); *G06T 2207/10028* (2013.01); *G06T 2207/20084* (2013.01)

(58) Field of Classification Search
CPC ........ B25J 9/1697; B25J 9/1664; B25J 9/161; B25J 9/163; B25J 19/023; B25J 13/089; G06T 2207/10048; G06T 2207/20084
See application file for complete search history.

(56) References Cited

U.S. PATENT DOCUMENTS 7,221,983 B2 * 5/2007 Watanabe ........ G05B 19/41815
718/104
7,236,618 B1 * 6/2007 Chui ...................... G06T 19/00
382/128

(Continued)

*Primary Examiner* — Dalena Tran

(57) ABSTRACT

A method in accordance with a particular embodiment of the present technology includes receiving, at data-processing hardware operably associated with a mobile robot, perception data corresponding to an object in an environment of the mobile robot. The method further includes generating, by the data-processing hardware and based at least partially on the perception data, a feature reference corresponding to a feature of the object. The method also includes generating, by the data-processing hardware, candidate object references based at least partially on different respective alignments between the feature reference and a model of the object. The method also includes selecting, by the data-processing hardware, one of the candidate object references based at least partially on a result of evaluating the candidate object references for accuracy. Finally, the method includes controlling, by the data-processing hardware, the mobile robot based at least partially on the selected candidate object reference.

19 Claims, 19 Drawing Sheets

(56) References Cited

U.S. PATENT DOCUMENTS

| | | | |
|---|---|---|---|
| 7,236,854 B2* | 6/2007 | Pretlove | G05B 19/42 |
| | | | 318/568.22 |
| 8,996,175 B2 | 3/2015 | Blumberg et al. | |
| 2007/0001638 A1* | 1/2007 | Gray | B25J 9/1692 |
| | | | 318/568.11 |
| 2007/0106421 A1* | 5/2007 | Kamrani | B25J 9/1661 |
| | | | 700/245 |
| 2021/0122045 A1 | 4/2021 | Handa et al. | |
| 2023/0182293 A1* | 6/2023 | Shaw | B25J 15/0616 |
| | | | 700/245 |

* cited by examiner

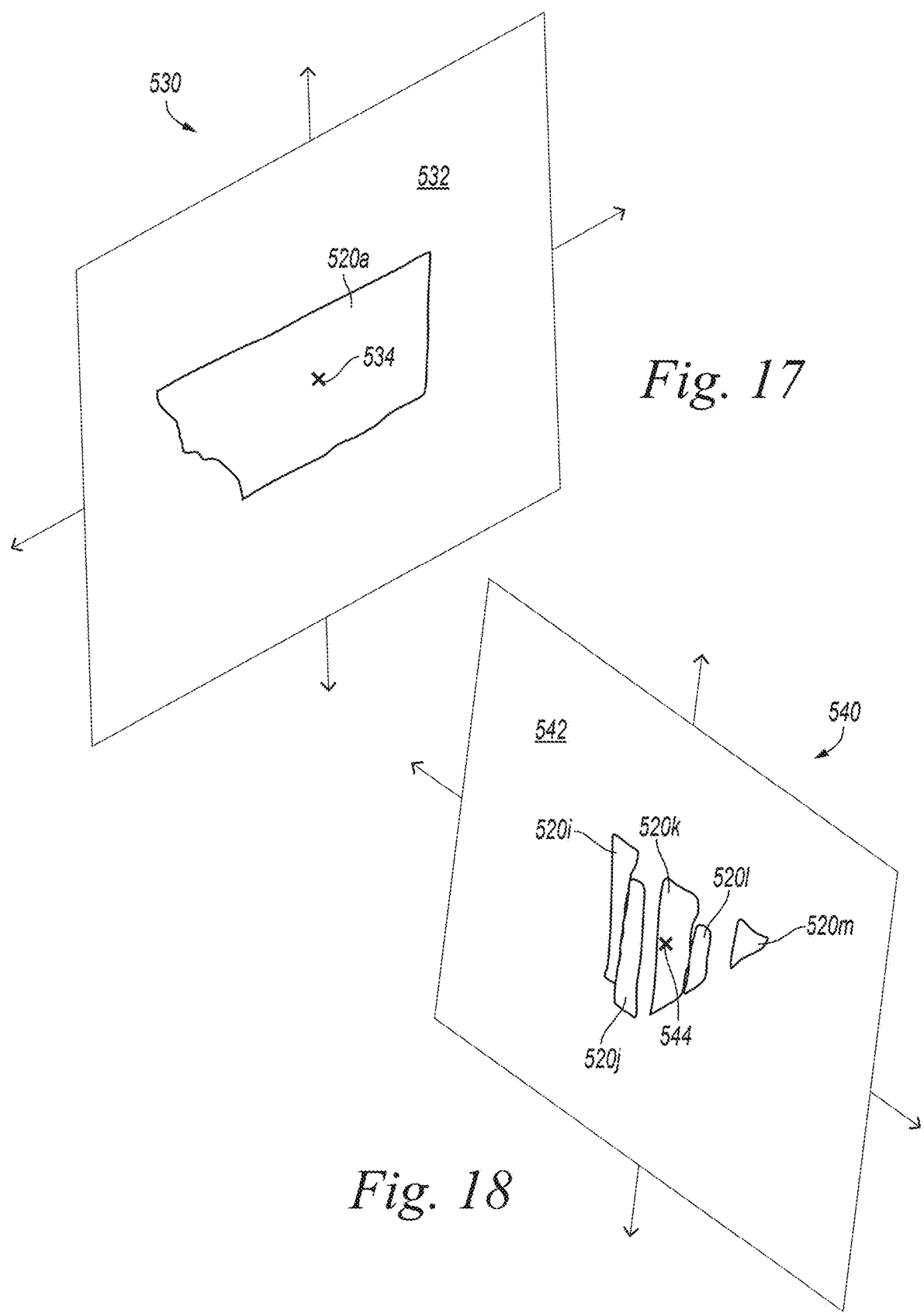

GENERATING OBJECT REFERENCES FROM PERCEPTION DATA IN UNSTRUCTURED ENVIRONMENTS AND RELATED TECHNOLOGY

CROSS-REFERENCE TO RELATED APPLICATION

This claims the benefit of: (1) U.S. Provisional Application No. 63/584,068, filed Sep. 20, 2023; and (2) U.S. Provisional Application No. 63/589,578, filed Oct. 11, 2023. The foregoing applications are incorporated herein by reference in their entirety. To the extent the foregoing applications or any other material incorporated by reference conflicts with the present disclosure, the present disclosure controls.

TECHNICAL FIELD

The present technology relates to object estimation in robotics.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and for other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 17 and 18 are representations of a first surface feature reference and a second surface feature reference, respectively, generated during the method of FIG. 10.

DETAILED DESCRIPTION

Figure 1:
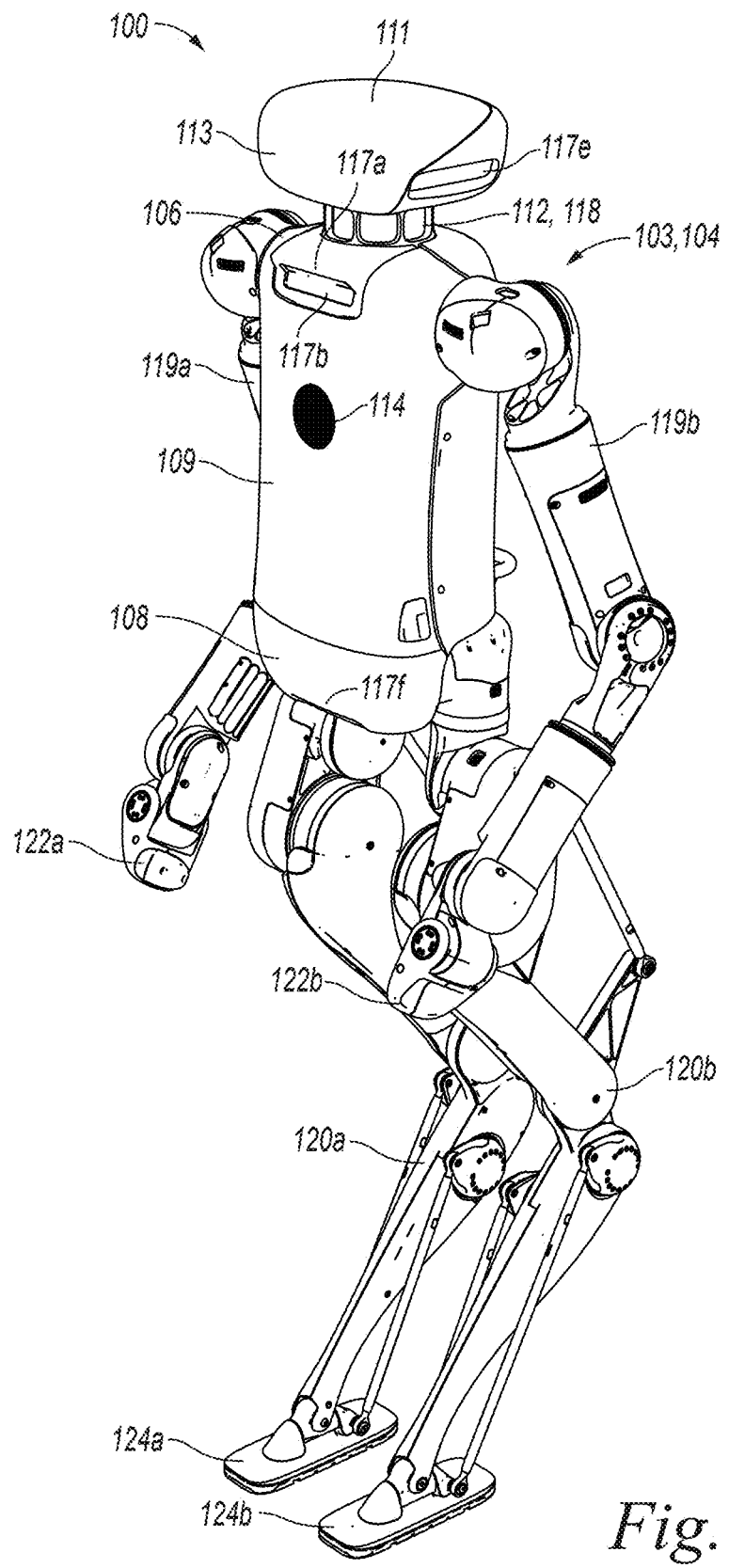
FIGS. 1-3 are, respectively, a first perspective view, a second perspective view, and a front profile view of a robot in accordance with at least some embodiments of the present technology.

Humans receive information about the environment via senses, analyze the information, and use the results to control behaviors. This process of sensing and control is also present in robotics. Modern robots are expected to work in dynamic environments and to perform dynamic tasks, both of which call for at least some level of sensing and control. In particular, many modern robots require a capacity for object estimation. This includes, among other things, generating references that a robot can use to interact with objects in the robot's environment. An object pose, as one example of an object reference, includes information about a position and an orientation of an object relative to a known reference, such as a reference frame of an environment, of another object, of the robot itself, etc. Given an object pose, a robot can control the respective poses of the robot's components so as to interact with the object in a desired manner. For example, a robot may use a pose of an object to determine joint commands that the robot can use to locate two end effectors at opposite respective sides of the object. This, in turn, can allow the robot to implement a grasping behavior involving squeezing the object between the end effectors. As another example, a robot may use poses of objects in an environment to determine joint commands that allow the robot to move through the environment without colliding with the objects.

Conventional approaches to generating object references from perception data (i.e., data that a robot collects about its environment via one or more sensors) are inadequate for many applications. One issue that conventional approaches fail to address adequately is that perception data tends to be incomplete. For example, only two or three sides of an object may be within a robot's field of view at any given time. Using multiple sensors at different locations in an environment or moving one or more sensors around an object may allow a robot to collect more complete perception data. These options, however, are not always possible or practical, particularly in crowded environments. Moreover, even when a relatively complete set of sensor data related to an object is available, conventional approaches may lack processes for giving the data adequate spatial context to be useful. Without a reliable process for determining how structures depicted in perception data are spatially associated with other structures in an environment, the perception data may be of little or no practical value for controlling a robot. For the foregoing and for other reasons, there is a need for innovation in the field of generating object references from perception data.

Devices, systems, and methods in accordance with at least some embodiments of the present technology include one or more innovations related to generating object references, using object references, or other aspects of object estimation in the context of robotics. Methods in accordance with at least some embodiments of the present technology leverage stored information about an object and a limited number of possible poses of the object when a pose of one feature of the object is known. The feature can be a surface. For example, a method in accordance with at least some embodiments of the present technology includes using surface normals to generate a surface feature reference for a surface of an object. The method further includes generating candidate object references by positioning a known model of the object at different positional or rotational offsets relative to the surface feature reference. The method also includes evaluating the candidate object references for accuracy, such as by comparing the candidate object references to other perception data or to perception data derivatives. In addition or alternatively, methods in accordance with at least some embodiments of the present technology include usings information that a neural network generates from perception data related to an object to generate an object reference. The information from the neural network can include a precursor to a point feature reference for a point feature of the object. In these and other cases, the method can include using a matching algorithm to generate an adjusted object reference from a preliminary object reference. Among other examples, the preliminary object reference can be a candidate object reference previously selected for accuracy.

The foregoing and other features of devices, systems, and methods in accordance with various embodiments of the present technology are further described below with reference to FIGS. 1-28. Although methods, devices, and systems may be described herein primarily or entirely in the context of bipedal robots that manipulate totes, other contexts are within the scope of the present technology. For example, suitable features of described methods, devices, and systems can be implemented in the context of object estimation for controlling other types of mobile robots (e.g., wheeled robots, tracked robots, etc.) or even in the context of object estimation for purposes other than controlling robots. Furthermore, suitable features of described methods, devices, and systems can be implemented in the context of generating estimates for objects other than totes, such as boxes, crates, non-packaged hard goods, irregularly shaped objects, etc. Finally, it should be understood, in general, that other methods, devices, and systems in addition to those disclosed herein are within the scope of the present technology. For example, methods, devices, and systems in accordance with embodiments of the present technology can have different or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Robot Systems

Figure 2:
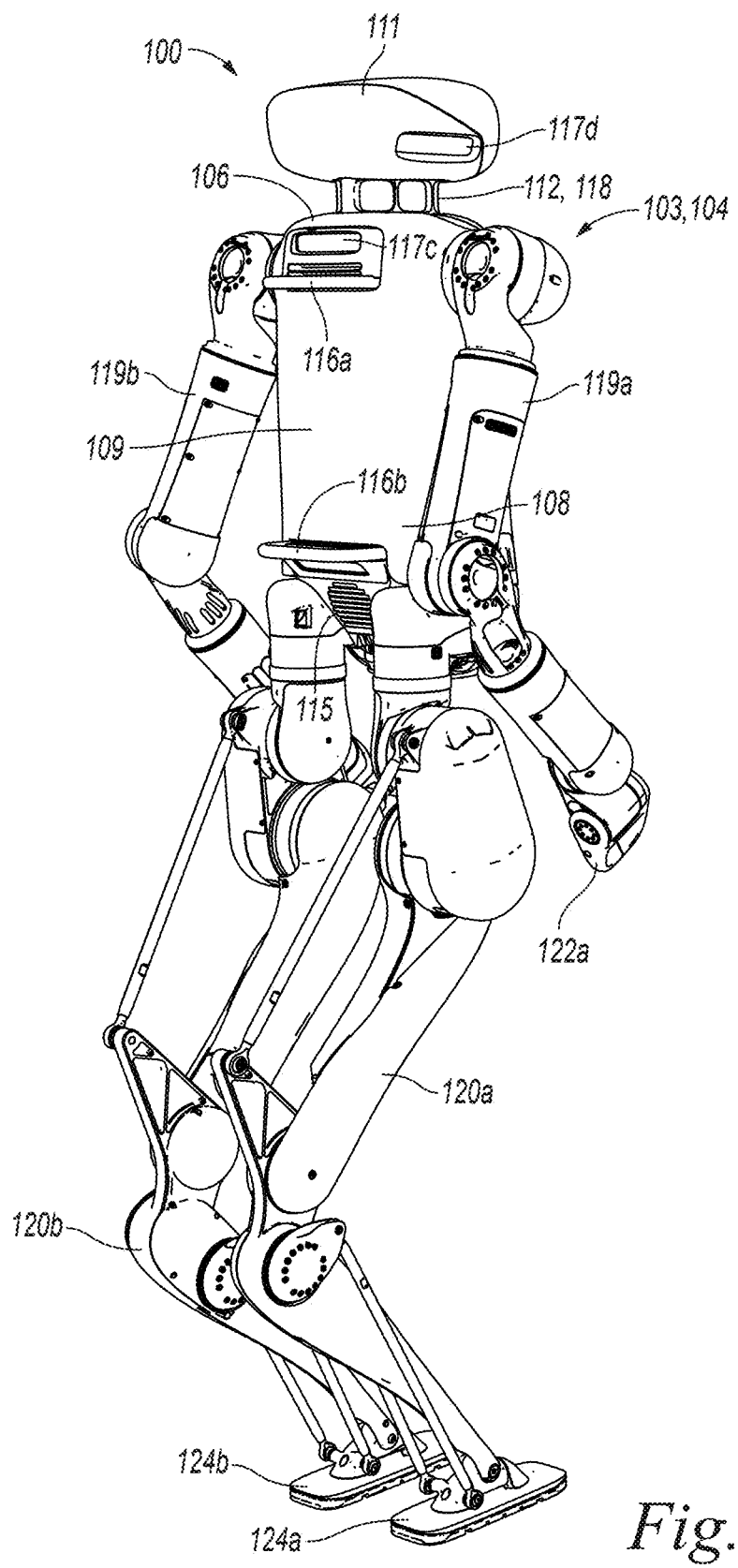
Figure 3:
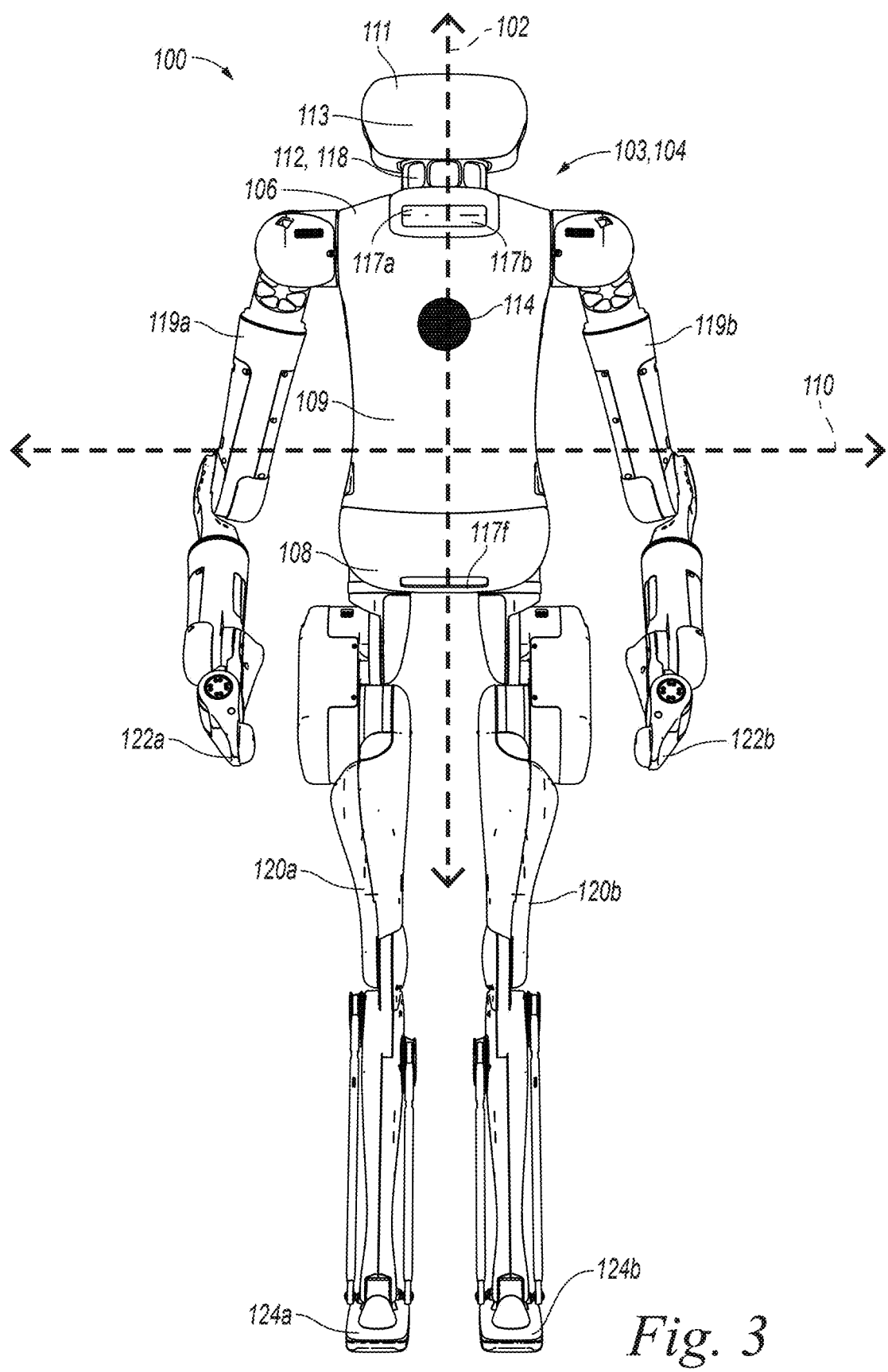

FIGS. 1 and 2 are different perspective views of a robot 100 in accordance with at least some embodiments of the present technology. FIG. 3 is a front profile view of the robot 100. As shown in FIGS. 1-3, the robot 100 can include structures resembling human anatomy with respect to the features, positions, or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, hexapedal locomotion, octopedal locomotion, etc.) or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104.

The robot 100 can still further include elongate sensor bays 117 (individually identified as elongate sensor bays 117a-117f) carried by the torso 104 and the head 111. The sensor bay 117a can be at the anterior side of the superior portion 106 of the torso 104 and tilted inferiorly. The sensor bay 117b can be inferiorly adjacent to the sensor bay 117a at the anterior side of the superior portion 106 of the torso 104 and less tilted than the sensor bay 117a. The sensor bay 117c can be at the posterior side of the superior portion 106 of the torso 104 and posteriorly directed. The sensor bays 117d, 117e can be at opposite respective sides of the head 111 and can be directed in opposite respective lateral directions. The sensor bay 117f can be at the inferior portion 108 of the torso 104 and directed anteriorly and inferiorly toward a ground level in front of the robot 100. The robot 100 can further include a cylindrical sensor bay 118 at the neck 112. At the elongate sensor bays 117a-117f and at the cylindrical sensor bay 118, the robot 100 can include perception sensors through which the robot 100 can receive information about an environment in which it operates. The perception sensors can emit or receive optical, audio, electromagnetic, or other types of signals. Examples of suitable perception sensors include cameras (e.g., red-green-blue (RGB) cameras, infrared cameras, stereoscopic cameras, etc.), light detection and ranging (LIDAR) sensors, and sound navigation and ranging (SONAR) sensors. In a particular example, the robot 100 includes cameras at the elongate sensor bays 117a-117f and a LIDAR sensor at the cylindrical sensor bay 118.

The robot 100 can further include articulated appendages carried by the torso 104. Among these articulated appendages, the robot 100 can include arms 119a, 119b and legs 120a, 120b. At individual articulations of the arms 119a, 119b and legs 120a, 120b, the robot 100 can include a joint and a corresponding actuator, such as a rotary actuator with a motor and gearing (e.g., cycloidal gearing or strain-wave gearing). For clarity of illustration, the joints and actuators are not labeled with reference numbers in FIGS. 1-3. In at least some cases, the robot 100 is configured to manipulate objects via the arms 119a, 119b, such as bimanually. In these and other cases, the robot 100 can be configured to ambulate via the legs 120a, 120b, such as bipedally. The arms 119a, 119b and the legs 120a, 120b can define kinematic chains. In at least some cases, the kinematic chains corresponding to the arms 119a, 119b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. As parts of the arms 119a, 119b, the robot 100 can include end effectors 122a, 122b at distalmost portions of the corresponding kinematic chains. Similarly, as parts of the legs 120a, 120b, the robot 100 can include feet 124a, 124b at distalmost portions of the corresponding kinematic chains. In the illustrated embodiments, the end effectors 122a, 122b and the feet 124a, 124b are not articulated. In other embodiments, counterparts of the end effectors 122a, 122b and the feet 124a, 124b can be articulated, such as with one or more movable fingers or toes.

Examples of Electrical, Computer, and Software Systems

Figure 4:
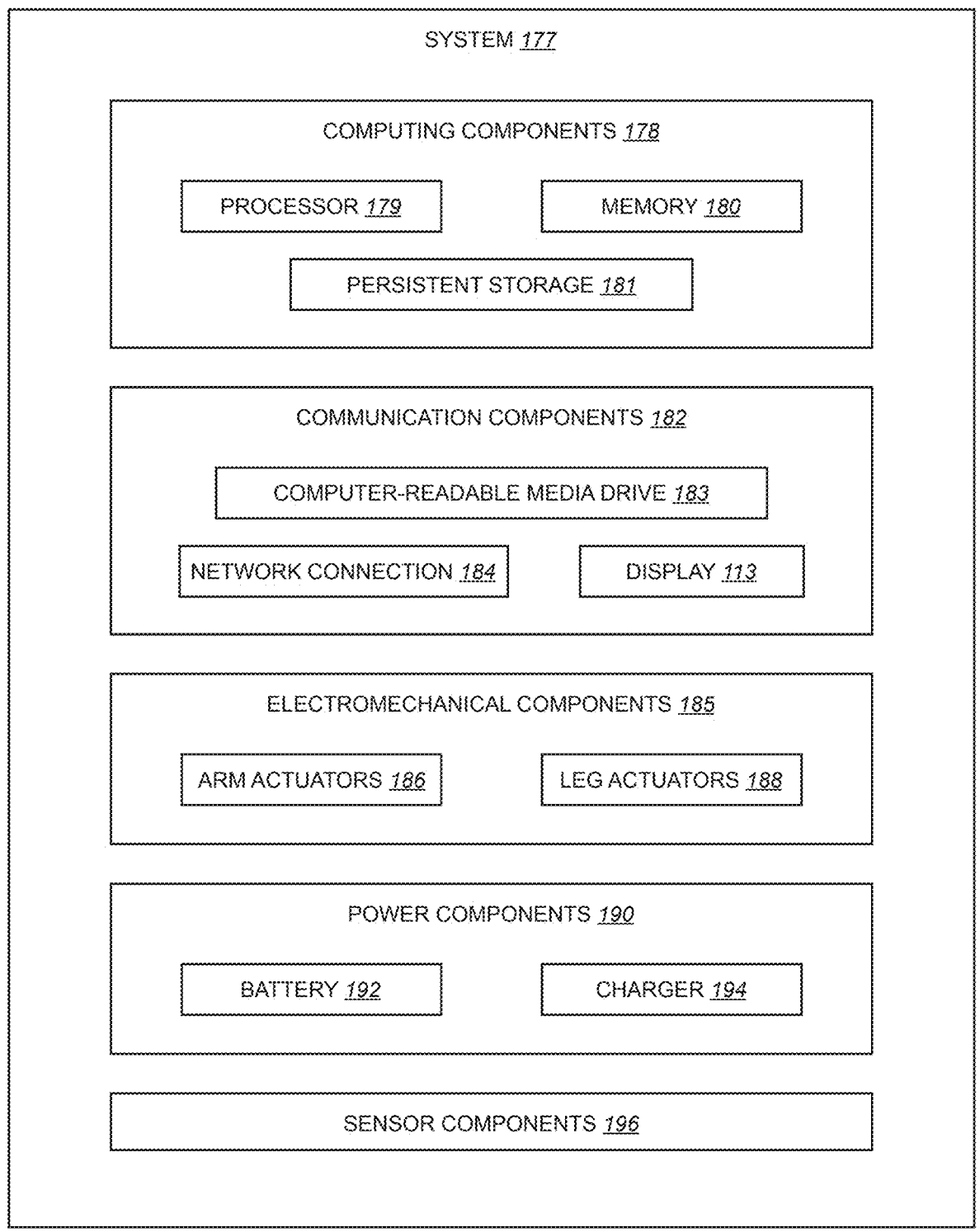
FIG. 4 is a block diagram depicting a system including electrical, computer, and software components of the robot of FIGS. 1-3.

When suitable, operations described elsewhere in this disclosure (e.g., data operations, movements of the robot 100, other operations of the robot 100, etc.) can be implemented at least partially via the electrical, computer, and software devices and systems disclosed in this section. FIG. 4 is a block diagram depicting a system 177 including electrical, computer, and software components of the robot 100. As shown in FIG. 4, the system 177 can include computing components 178. The computing components 178 can include a processor 179, such as one or more general-purpose or special-purpose integrated circuits including digital logic gates for executing programs or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, or otherwise usefully interact with other components of the system 177.

The system 177 can further include communication components 182. The communication components 182 can include a computer-readable media drive 183 for reading computer programs or other data stored on computer-readable media. As one example, the computer-readable media drive 183 can be a flash-memory drive. The communication components 182 can further include a network connection 184 for connecting the robot 100 to other devices and systems, such as other robots or other computer systems. The network connection 184 can be wired or wireless and can be via the Internet, a Local Area Network (LAN), a Wide Area Network (WAN), BLUETOOTH®, Wi-Fi®, a cell phone network, etc. The network connection 184 can include networking hardware, such as routers, switches, transmitters, receivers, computer-readable transmission media, etc. The communication components 182 can further include the display 113 discussed above or other suitable components for communicating with a user. The robot 100 can use the communication components 182 for internal or external operations. Examples of these operations include interacting with systems that provide contextual information about the environment in which the robot 100 operates and interacting with systems for changing operating conditions of the robot 100.

The system 177 can further include electromechanical components 185. The electromechanical components 185 can include arm actuators 186 and leg actuators 188 at joints of the arms 119a, 119b and legs 120a, 120b, respectively, as discussed above. In addition or alternatively, the electromechanical components 185 can include other suitable components for implementing mechanical action within the robot 100. As shown in FIG. 4, the system 177 can further include power components 190, such as a battery 192 and a charger 194. The battery 192 can be a lithium-ion battery, a lead-acid battery, or a battery of another suitable type. The charger 194 can include a connector (not shown) compatible with a power source (e.g., a wall outlet) and leads (also not shown) extending between the connector and the battery 192. In at least some cases, the robot 100 is configured to operate wirelessly via the battery 192 and to recharge via the charger 194.

Finally, the system 177 can include sensor components 196 for capturing, providing, or analyzing information about the robot 100 itself or the environment in which the robot 100 operates. The sensor components 196 can include the examples discussed above of sensors at the elongate sensor bays 117 and at the cylindrical sensor bay 118. At these or at one or more other suitable locations, the robot 100 can include among the sensor components 196, a vision sensor (e.g., a camera), a light sensor (e.g., a photoresistor), a sound sensor (e.g., a microphone), a location sensor (e.g., a Global Positioning System sensor), a two-dimensional sensor, a three-dimensional sensor, or a proximity sensor, among other examples. Within the body 103 or at one or more other suitable locations, the robot 100 can include among the sensor components 196, an accelerometer, a gyroscope, a magnetometer, or a tilt sensor, among other examples. At the end effectors 122a, 122b, at the feet 124a, 124b, or at one or more other suitable locations, the robot 100 can include among the sensor components 196, a contact sensor or a force sensor, among other examples. In at least some cases, two or more different types of sensors are incorporated into a sensor assembly of the robot 100. For example, an accelerometer, a gyroscope, and a magnetometer can be incorporated into an inertial measurement unit (IMU) through which the robot 100 can determine acceleration, angular velocity, and orientation. The robot 100 can include an IMU within the torso 104, within the head 111, or at one or more other suitable locations.

At one, some, or all of the arm actuators 186, at one, some, or all of the leg actuators 188, or at one or more other suitable locations, the robot 100 can include among the sensor components 196, sensors that measure properties of the corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the robot 100 may sense a torque acting on a given joint via a torque sensor operably associated with the joint. As another example of direct sensing, the robot 100 may sense a position of a given joint via an encoder operably associated with the joint. Any joint described herein should be construed as potentially including a torque sensor, encoder, or other suitable mechanism for direct sensing. As an example of indirect sensing, the robot 100 may sense a position of a given one of the end effectors 122a, 122b or other component based on perception data corresponding to the component and other perception data corresponding to a reference. The robot 100 can include one or more sensors in a sensor system, such as a vision system, a LIDAR system, a stereoscopic camera system, a SONAR system, etc. In at least some cases, the robot 100 monitors itself or its environment in real-time or in near real-time. Moreover, the robot 100 may use acquired sensor data as a basis for decision-making via the computing components 178.

Components of the system 177 can be connected to one another or to other components of the robot 100 via suitable conductors, transmitters, receivers, circuitry, etc. While the system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the system 177 to control physical aspects of the robot 100 according to one or more designated rules encoded in software. For example, these rules can include minimums or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of or functions performed by the robot 100.

Software features of the robot 100 may take the form of computer-executable instructions, such as program modules executable by the computing components 178. Generally, program modules include routines, programs, objects, components, data structures, or the like configured to perform particular tasks based on source data, which may be encrypted. Control scripts may be implemented via a suitable language, such as in C/C++ or Python®. The functionality of the program modules may be combined or distributed in various embodiments, including in cloud-based implementations, web applications, mobile applications for mobile devices, etc. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, a WAN, or the Internet. In a distributed computing environment, program modules and other components may be located in both local and remote memory storage and in other devices, which may be in communication via one or more wired or wireless communication channels.

Aspects of the present technology may be stored or distributed on tangible computer-readable media, which can include volatile or non-volatile storage components, such as magnetically or optically readable computer media, hard-wired or preprogrammed chips (e.g., electrically erasable programmable read-only memory semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks) on a propagated signal on a propagation medium (e.g., electromagnetic wave(s), sound wave(s), etc.) over a period of time. Furthermore, such data may be provided on an analog or a digital network and packet switched, circuit switched, or managed under another suitable scheme. The term computer-readable storage medium as used herein does not, however, encompass signals (e.g., propagating signals) or transitory media. One of ordinary skill in the art will recognize that various components of the robot 100 may communicate via any number of wired or wireless communication techniques and that elements of the robot 100 may be distributed rather than located in a single monolithic entity. Finally, electrical and computing aspects of systems in accordance with various embodiments of the present technology may operate in environments or according to processes other than the examples of environments and processes described herein.

Figure 5:
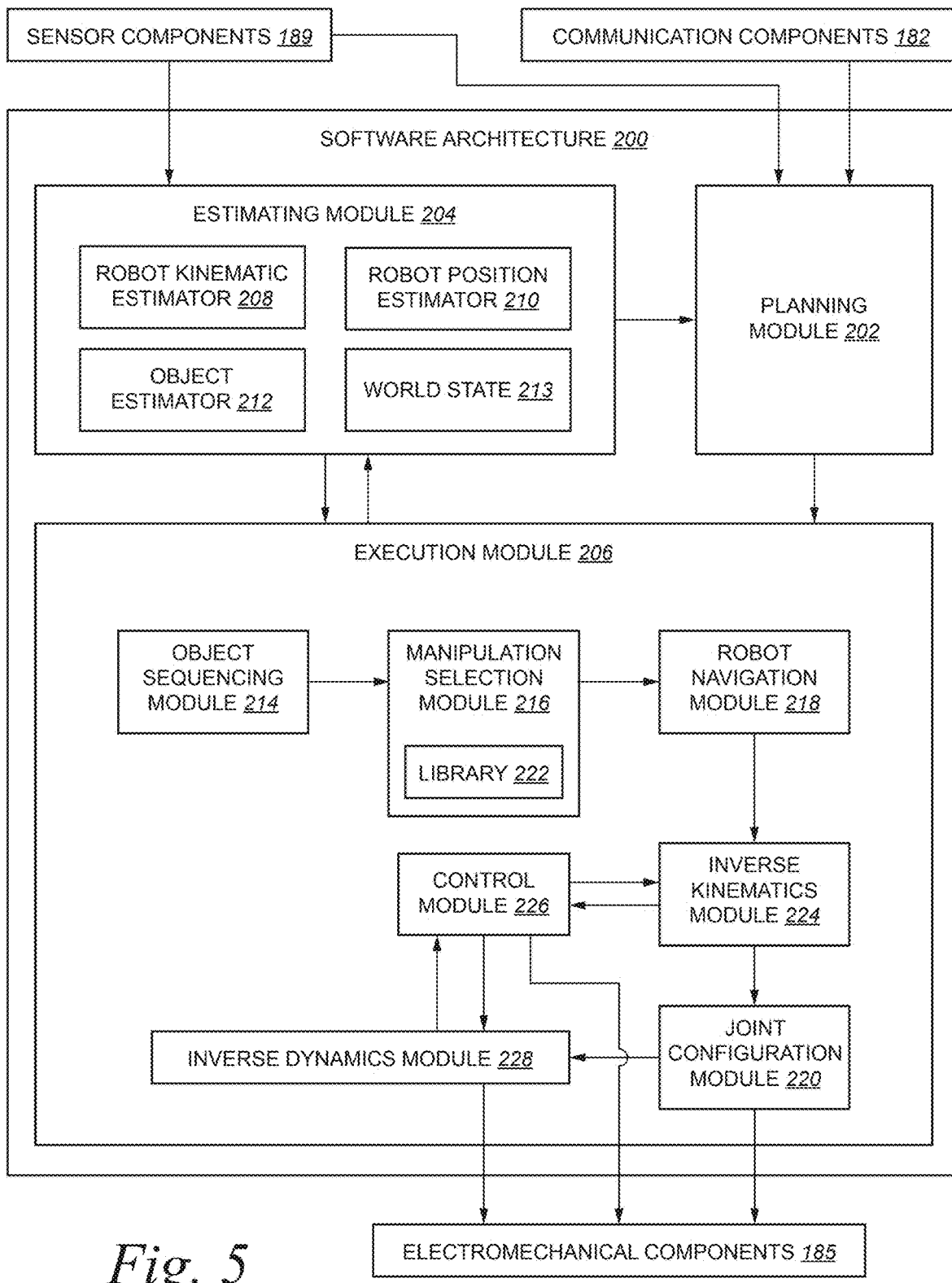
FIG. 5 is a block diagram depicting software architecture and associated portions of the system of FIG. 4.

FIG. 5 is a block diagram depicting a software architecture 200 and associated portions of the system 177. The software architecture 200 can be within the memory 180 or otherwise operably associated with any or all of the various components of the system 177 as described above. With reference to FIGS. 4 and 5 together, the software architecture 200 can include a planning module 202, an estimating module 204, and an execution module 206 operably associated with one other. The planning module 202 can be configured to relay or to generate a plan corresponding to an objective for the robot 100 (e.g., unload all objects on a shelf, retrieve an object from a first location and move the object to a second location, etc.). In at least some cases, the planning module 202 receives information from the communication components 182 and relays or generates a plan based at least partially on the received information. For example, the planning module 202 may receive a command from a user via the communication components 182 and relay the command as a plan. As another example, the planning module 202 may receive a command from a user via the communication components 182 and generate a plan related to the command. As yet another example, the planning module 202 may generate a plan without receiving a command from a user, such as at a predetermined time or in response to information about a current state of the robot 100 or the environment received via the sensor components 196.

The estimating module 204 can receive information from the sensor components 196 and generate estimates in real time or in near real time to inform generating or executing a plan. The estimating module 204 can include a robot kinematic estimator 208, a robot position estimator 210, an object estimator 212, and a world state 213. The robot kinematic estimator 208 can generate an estimate of a current kinematic state of the robot 100 (e.g., balanced, off-balance, walking, standing, etc.) and estimates of positions of individual joints of the robot 100. The robot position estimator 210 can generate a current estimate of a position of the robot 100 within an environment. This position can be a set of coordinates and can be based on perception information, GPS information, or other information received by or generated by the robot 100. Perception information potentially relevant to the position of the robot 100 includes, among other examples, information corresponding to distances between the robot 100 and landmarks in an environment and information corresponding to fiducial markings (e.g., AprilTags) carried by or otherwise associated with the landmarks. This information can be detected, for example, via a three-dimensional sensor of the robot 100 or via a camera of the robot 100. Furthermore, information can move between components of the estimating module 204. For example, the world state 213 can receive information from the robot kinematic estimator 208, the robot position estimator 210, and the object estimator 212. In addition or alternatively, the object estimator 212 can receive information from the robot kinematic estimator 208 and the robot position estimator 210 directly.

The object estimator 212 can generate a current estimate of an object (e.g., a tote) within an environment. In at least some cases, the estimate is a pose or other reference corresponding to a position of an object. As with the position of the robot, the position of an object can be a set of coordinates and can be based on perception information, GPS information, or other information received by or generated by the robot 100. Perception information potentially relevant to the position of an object includes, among other examples, information corresponding to distances between the object and the robot 100, distances between the object and landmarks in an environment, and information corresponding to fiducial markings (e.g., AprilTags) carried by or otherwise associated with the object. This information can be detected, for example, via a three-dimensional sensor of the robot 100 or via a camera of the robot 100. In at least some cases, the object estimator 212 uses information (e.g., sensor poses) from the robot kinematic estimator 208 or the robot position estimator 210 to inform generation of object estimates. This can be useful, for example, when a fiducial or other landmark in an environment is not visible. Details of the object estimator 212 are further described below with reference to FIG. 6. In at least some cases, the object estimator 212 is configured to update the world state 213 with object references, support structure references, or other information related to objects in an environment in which the robot 100 operates.

The execution module 206 can be configured to receive a plan from the planning module 202 and estimates from the estimating module 204. The execution module 206 can include an object sequencing module 214, a manipulation selection module 216, a robot navigation module 218, and a joint configuration module 220. The planning module 202 can be configured to send a plan to the object sequencing module 214, to the manipulation selection module 216, to the robot navigation module 218, or to the joint configuration module 220 based on attributes of the plan. For example, when a plan includes explicit instructions for positions of the electromechanical components 185, the planning module 202 can send the plan to the execution module 206 via the joint configuration module 220. As another example, when a plan does not involve manipulating an object, the planning module 202 can send the plan to the execution module 206 via the robot navigation module 218. As yet another example, when a plan concerns only one object and the object is remote to the robot 100, the planning module 202 can send the plan to the execution module 206 via the manipulation selection module 216. As a final example, when a plan concerns multiple objects remote to the robot 100, the planning module 202 can send the plan to the execution module 206 via the object sequencing module 214.

The object sequencing module 214 can receive one or more estimates from the estimating module 204 and can generate a sequence in which multiple objects are to be manipulated. For example, when the object sequencing module 214 receives a plan to unload a shelf, the object sequencing module 214 can query the estimating module 204 for current locations of objects on the shelf. The object sequencing module 214 can then assign the objects an order, convert the order into a queue, and pass the queue to the manipulation selection module 216. The manipulation selection module 216 can include a library 222 including two or more different motion sequences that can be used to manipulate an object. The manipulation selection module 216 can select a motion sequence for a given object based on information, such as information about the object or information about the environment. The robot navigation module 218 can generate targets for different parts of the robot 100 further to a plan or to a portion of a plan being executed. Examples of targets include positions of the feet 124a, 124b in the environment, positions of the end effectors 122a, 122b in the environment, etc. The robot navigation module 218 can update these targets continuously or near continuously based on information from the estimating module 204. The execution module 206 can further include an inverse kinematics module 224 that translates the targets from the robot navigation module 218 into joint configurations throughout the robot 100.

The execution module 206 can also include a control module 226 that receives joint configurations from the inverse kinematics module 224 and generates joint parameters (e.g., positions, velocities, accelerations, etc.) to be executed by the robot 100 to achieve these joint configurations. Through continuous or near-continuous communication with the inverse kinematics module 224, the control module 226 can modify the joint parameters to at least partially compensate for deviations as the robot 100 executes the joint configurations. The inverse kinematics module 224 can send other joint configurations not subject to active control to the joint configuration module 220 directly. Similar to the control module 226, the joint configuration module 220 can generate joint parameters (e.g., positions, velocities, accelerations, etc.) to be executed by the robot 100 to achieve joint configurations received from the inverse kinematics module 224 or from the planning module 202.

Finally, the execution module 206 can include an inverse dynamics module 228 that receives joint parameters from the control module 226 and from the joint configuration module 220. The inverse dynamics module 228 can track a desired wrench of the robot 100 and its relationship with objects in the environment. In at least some cases, the inverse dynamics module 228 references a map of robot positions and wrenches to joint torques. Based at least partially on tracking, the inverse dynamics module 228 can modify joint parameters to achieve a desired result. For example, the inverse dynamics module 228 can modify joint parameters from the control module 226 and from the joint configuration module 220 to maintain contact between the end effectors 122a, 122b and an object as the robot 100 carries the object. The inverse dynamics module 228 can then send modified joint parameters to the electromechanical components 185 for execution. For configurations that do not involve dynamic interaction with the environment, the control module 226 and the joint configuration module 220 can send joint parameters directly to the electromechanical components 185 for execution.

Figure 6:
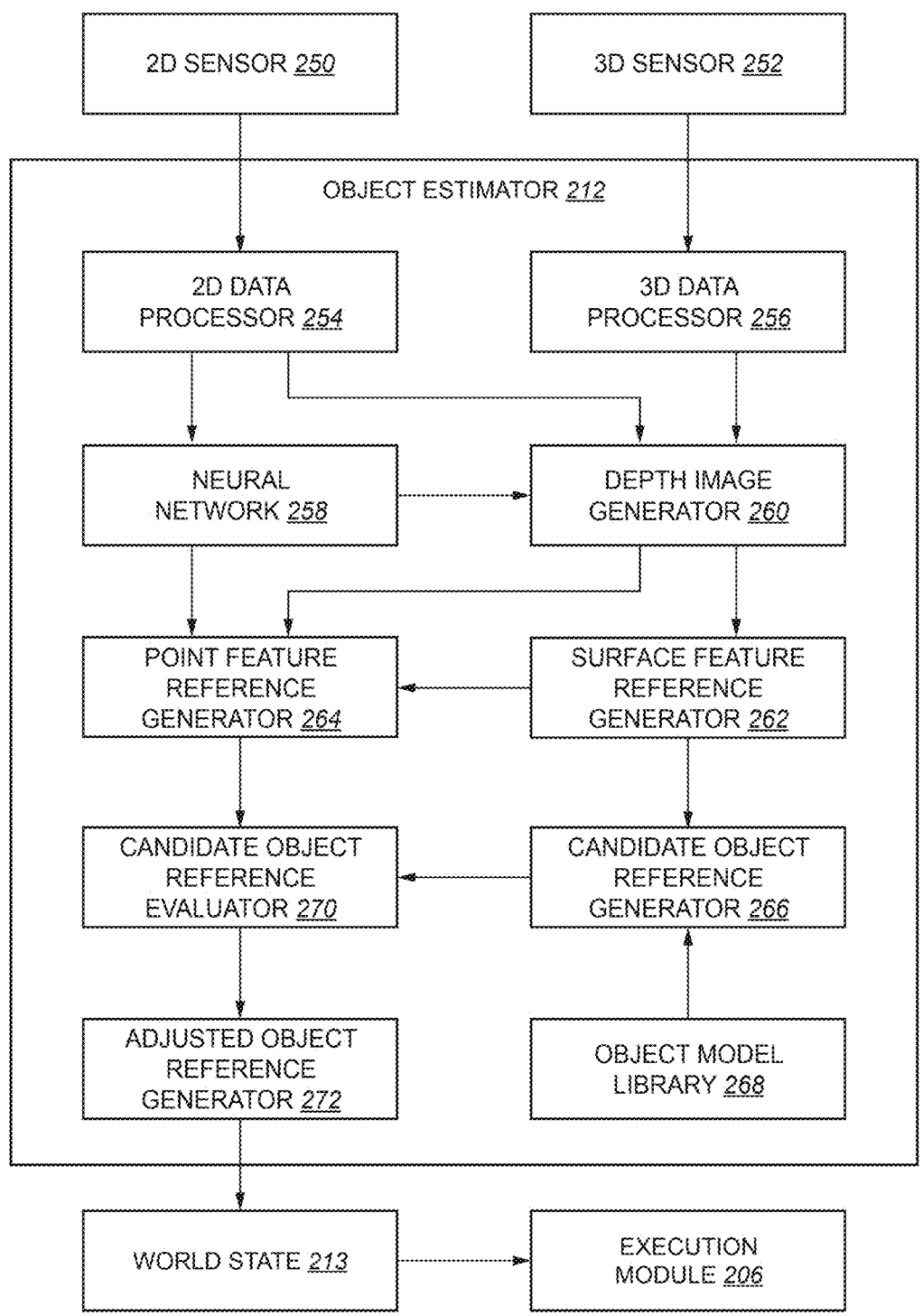
FIG. 6 is a block diagram depicting an object estimator of the software architecture of FIG. 5 and associated portions of the system of FIG. 4.

FIG. 6 is a block diagram depicting the object estimator 212 and associated portions of the system 177. As shown in FIG. 6, the system 177 can include a two-dimensional sensor 250 and a three-dimensional sensor 252 among the sensor components 196. The object estimator 212 can receive two-dimensional data (e.g., image data) and three-dimensional data (e.g., depth data) from the two-dimensional sensor 250 and the three-dimensional sensor 252, respectively. The object estimator 212 can further include a two-dimensional data processor 254 and a three-dimensional data processor 256 configured to process data from the two-dimensional sensor 250 and the three-dimensional sensor 252, respectively. In at least some cases, the two-dimensional data processor 254 downsizes the two-dimensional data to a resolution closer to or the same as a resolution of the three-dimensional data. In addition or alternatively, the two-dimensional data processor 254 can register the two-dimensional data to a reference frame of the two-dimensional sensor 250. Similarly, the three-dimensional data processor 256 can register the three-dimensional data to a reference frame of the three-dimensional sensor 252.

The object estimator 212 can further include a neural network 258 that receives processed data from the two-dimensional data processor 254. In a particular example, the neural network 258 is at least partially based on Detectron2 (Facebook AI Research) with a Mask R-CNN implementation. The neural network 258 can be configured to recognize objects of interest in the two-dimensional data and to provide estimates of features of these objects. For example, the neural network 258 can be trained to recognize a tote and to provide keypoints corresponding to features (e.g., corners) of the tote. In addition or alternatively, the neural network 258 can be trained to provide non-keypoint references of an object, such as a contour corresponding to an outline of a tote. Training the neural network 258 can include providing the neural network 258 with training images depicting totes or other objects of interest in structured or unstructured environments. The training images can be gathered from the two-dimensional sensor 250 of the robot 100, from sensors of other robots, or from non-robot sensors, such as mounted sensors, scanning sensors, human-carried sensors, etc. Once gathered, the training images can be human or machine annotated to include useful information that the neural network 258, once trained, will provide for new images. In the illustrated example, input and output to and from the neural network 258 is two-dimensional. In another example, a counterpart of the neural network 258 can be trained on, receive, or output three-dimensional information.

As shown in FIG. 6, the object estimator 212 can further include a depth image generator 260 that receives three-dimensional data from the three-dimensional data processor 256 and receives two-dimensional data from the two-dimensional data processor 254. The depth image generator 260 can further receive estimate data from the neural network 258, such as estimates (e.g., two-dimensional keypoint estimates, contour estimates, etc.) or other information (e.g., labels) that the neural network 258 generates from the two-dimensional data. The depth image generator 260 can use a known relationship between respective reference frames of the two-dimensional sensor 250 and the three-dimensional sensor 252 to combine the two-dimensional data and the three-dimensional data into a depth image. The resulting depth image can include three-dimensional information (e.g., coordinates) for all or only some (e.g., representative pixels) of the incoming two-dimensional information. The information from the neural network 258 can be incorporated into the depth image in conjunction with the two-dimensional information from the two-dimensional data processor 254. The interaction between the two-dimensional data processor 254, the three-dimensional data processor 256, the neural network 258, and the depth image generator 260 illustrated in FIG. 6 is just one example. In other examples, these components can interact with one another in another suitable manner. For example, the depth image generator 260 can receive estimates from the neural network 258 via the two-dimensional data processor 254 rather than directly.

With reference again to FIG. 6, the object estimator 212 can further include a surface feature reference generator 262 and a point feature reference generator 264, both of which receive input from the depth image generator 260. The surface feature reference generator 262 and the point feature reference generator 264 can generate feature references for different respective features of an object depicted in a depth image from the depth image generator 260. In at least some cases, the surface feature reference generator 262 and the point feature reference generator 264 use different processes to generate surface feature references and point feature references, respectively. For example, after object segmentation via the neural network 258, the surface feature reference generator 262 can use a process based primarily on depth information from the three-dimensional sensor 252 while the point feature reference generator 264 uses a process based primarily on this depth information and additional estimate information from the neural network 258. The surface feature reference generator 262 may make little or no use of estimate information from the neural network 258 beyond that associated with object segmentation. Accordingly, output from the surface feature reference generator 262 may be relatively independent of any error in such estimate information.

In at least some cases, the surface feature reference generator 262 is configured to identify one or more approximately planar features in a depth image from the depth image generator 260 and to identify centroids, planes, or other representations corresponding to the one or more approximately planar features. In these and other cases, the surface feature reference generator 262 can output a set of these representations collectively as a surface feature reference and pass at least a portion (e.g., at least a constituent plane) of the surface feature reference to the point feature reference generator 264 for use with information from the neural network 258 in generating one or more point feature references. In an example, the surface feature reference generator 262 separates a portion of a depth image within a contour indicating an object boundary, identifies an approximately planar feature in the separated portion of the depth image, and outputs a centroid, a plane, and a point cloud corresponding to the approximately planar feature. This can occur for one, some, or all approximately planar features in the separated portion of the depth image. Thus, the surface feature reference generator 262 can output multiple surface feature references for different approximately planar features of an object.

The surface feature reference generator 262 can be configured to identify approximately planar features based at least partially on surface normals. For example, the surface feature reference generator 262 may generate surface normals for segments (e.g., voxels) in a depth image based at least partially on three-dimensional information for neighboring segments. The surface feature reference generator 262 can then cluster the surface normals, such as via a Euclidean clustering algorithm. When surface normals clustered in this or another suitable manner are sufficiently similar, the corresponding segment can be classified as an approximately planar feature. An algorithm for determining the level of similarity for such classification can be tuned to allow an object feature to be classified as approximately planar even if some portions of the feature (and the corresponding surface normals) are not planar. The centroid of an approximately planar feature can be at the average width, average height, and average depth of the feature, among other forms of this metric. An orientation of the centroid can be an average orientation of the surface normals of the corresponding approximately planar feature. The surface feature reference generator 262 can determine a plane corresponding to an approximately planar feature via a plane fitting algorithm, such as a random sample consensus algorithm. Planes with similar equations (i.e., normals and offsets) can be grouped to avoid duplication. Using these or other suitable processing techniques, planes can be generated for major surfaces of an object even if the major surfaces are not uniformly flat, such as because they include ridges, grooves, lips, etc.

The point feature reference generator 264 can receive a depth image from the depth image generator 260 and can receive a surface feature reference from the surface feature reference generator 262. The point feature reference generator 264 can be configured to use the surface feature reference to convert a two-dimensional keypoint from the neural network 258 into a three-dimensional point feature reference. In at least some cases, the point feature reference generator 264 uses a reference frame for the two-dimensional sensor 250 to determine a ray corresponding to a two-dimensional keypoint from the neural network 258. The point feature reference generator 264 can then determine an intersection of the ray and a plane of the surface feature reference. Finally, the point feature reference generator 264 can associate the intersection with a label from the neural network 258 for the corresponding object feature and output this intersection and label as a point feature reference corresponding to the object feature. Accordingly, the resulting point feature reference can be a labeled three-dimensional keypoint.

In at least some cases, the point feature reference generator 264 receives multiple planes from the surface feature reference generator 262 and differentiate the respective intersections of a ray and these planes. This differentiation can be based at least partially on proximity between the intersections and one or more point clouds corresponding to the planes. For example, if an object corner is known to lie between two sides of an object, intersections of a ray of a two-dimensional keypoint for the object corner and planes corresponding to these two sides of the object can be assumed to be in close proximity to one another. Moreover, point clouds corresponding to at least some other planes of the object are likely to not be in close proximity to the intersection. The point feature reference generator 264 can use one or more such proximity relationships to differentiate an intersection corresponding to a point feature of an object from another intersection. Through a cost function or another suitable computational process, the point feature reference generator 264 can determine an alignment of two or more intersections with one or more point clouds that reduces or eliminates intersection-to-point-cloud proximities that indicate misalignment. Furthermore, as discussed above, a counterpart of the neural network 258 can be trained on, receive, and output three-dimensional information. In such cases, the counterpart of the neural network 258 can receive three-dimensional information from the three-dimensional data processor 256 directly and can output a point feature reference directly. In these and other cases, a counterpart of the point feature reference generator 264 can be part of the counterpart of the neural network 258.

With reference again to FIG. 6, the object estimator 212 can further include a candidate object reference generator 266 and an object model library 268 operably associated with one another. The object model library 268 can store structure data (e.g., CAD data) for one or more objects of interest. For example, the object model library 268 can store a CAD model for a tote, a box, or a crate when the robot 100 is deployed in an environment in which the tote, box, or crate is likely to be encountered. The candidate object reference generator 266 can be configured to select an object model from the object model library 268 and to generate candidate object references at different respective alignments of the object model relative to a surface feature reference from the surface feature reference generator 262. The candidate object reference generator 266 can leverage an object's geometry to limit the number of possible orientations the object may have relative to a surface feature reference from the surface feature reference generator 262. For example, a typical tote has four sides and is symmetrical about its width and length. The candidate object reference generator 266 can leverage the limited number of sides, the widthwise symmetry, the lengthwise symmetry, or other aspects of the tote's geometry to generate a set of candidate object references.

Individual candidate object references can be instances of the object model with position or orientation information from one or more surface feature references. In some cases, the candidate object references are independent of estimates from the neural network 258 and any associated variability. For example, the candidate object references can be direct derivatives of perception data. In other cases, the candidate object references can be associated with estimates from the neural network 258 with respect to object identification, but not with respect to object position or orientation. For example, the candidate object reference generator 266 can select an object model from the object model library 268 based at least partially on an object identification label from the neural network 258 and use three-dimensional information from a surface feature reference that is a direct derivative of perception data to generate candidate poses of the object model in three-dimensional space. In still other cases, the candidate object reference generator 266 may make more extensive use of estimates from the neural network 258.

The object estimator 212 can further include a candidate object reference evaluator 270 configured to receive candidate object references from the candidate object reference generator 266. In at least some cases, the candidate object reference evaluator 270 uses one or more point feature references from the point feature reference generator 264 to evaluate candidate object references for accuracy. This can include executing a comparison algorithm that accounts for factors such as a distance between a point feature reference and a corresponding portion of a candidate object reference. The comparison algorithm can generate respective scores for candidate object references that the candidate object reference evaluator 270 then uses to select a candidate object reference that most closely corresponds to one or more point feature references from the point feature reference generator 264.

The object estimator 212 can also include an adjusted object reference generator 272 configured to resolve any remaining discrepancy between a selected candidate object reference and one or more point feature references. In at least some cases, the adjusted object reference generator 272 uses the selected candidate object reference and one or more point feature references to generate an adjusted object reference that matches an object of interest more closely than the selected candidate object reference matches the object. The adjusted object reference generator 272 can use a matching algorithm, such as an iterative closest point algorithm. Finally, the object estimator 212 can update the world state 213 with the adjusted object reference from the adjusted object reference generator 272, which can then be made available to the execution module 206 for use in controlling the robot 100.

With reference to FIGS. 4-6 together, suitable software components disclosed herein can be part of a distributed system or component thereof or implemented as one or more network-based services. For example, a compute cluster within a computing service may present computing or storage services or other types of services that employ any distributed computing systems described herein to clients as network-based services. In some embodiments, a network-based service may be implemented by a software or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke, and may define a particular application programming interface (API) to which other systems may be expected to conform when requesting the various operations. An API refers to an interface or other communication protocol between a client and a server, such that if the client makes a request in a predefined format, the client should receive a response in a specific format or initiate a defined action. In the cloud provider network context, APIs may provide a gateway for customers to access cloud infrastructure by allowing customers to obtain data from or to cause actions within the cloud provider network, enabling the development of applications that interact with resources and services hosted in the cloud provider network. APIs can also enable different services of the cloud provider network to exchange data with one another.

In a distributed system, some or all of the software architecture 200 can be executed remote from the robot 100. For example, the robot 100 can be configured to collect raw sensor data via the sensor components 196 and to transmit some or all of this raw sensor data to a remote server in real time or near real time for processing. The robot 100 can then receive joint commands or other products of this processing via communication with the server. In these and other cases, computing operations can be allocated among local and remote computing systems depending on factors such as computing demand, available computing resources, time sensitivity of computing products, etc. Moveover, even the sensor components 196 can be remote from the robot 100 in certain cases. For example, a remote sensor may track its reference frame relative to a local sensor of the robot 100 and may communicate that reference frame with sensor data it collects at any given time. A server receiving the sensor data can then use the relationship between the reference frame of the local sensor and the reference frame of the remote sensor to generate output in a reference frame compatible with processes that rely on sensor data from the local sensor only. Alternatively, in a non-distributed system, all information processing and command execution can occur locally at the robot 100.

Examples of Generating Object References and Related Methods

Figure 7:
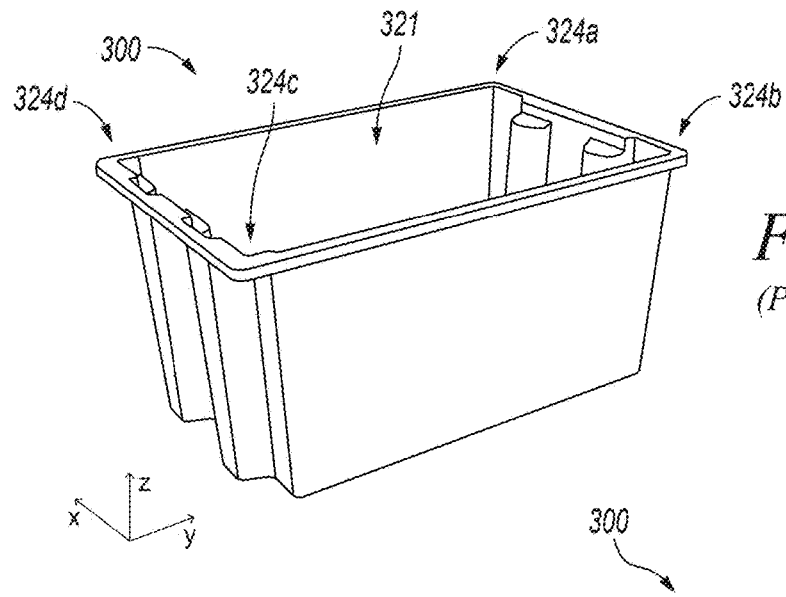
FIGS. 7-9 are, respectively, a perspective view, a side profile view, and a front profile view of an object that the robot of FIGS. 1-3 is capable of manipulating.
Figure 8:
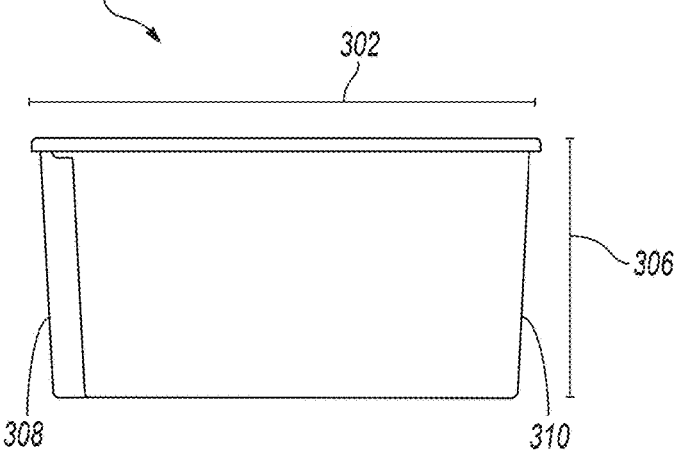
Figure 9:
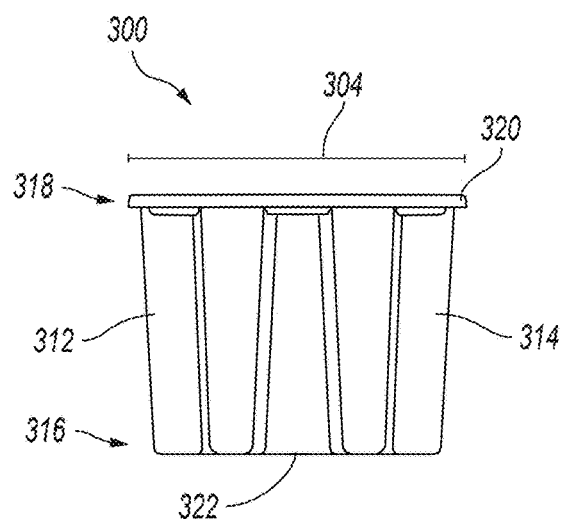

Methods in accordance with at least some embodiments of the present technology may be described in this section and elsewhere in this disclosure in the context of an object 300 as shown in FIGS. 7-9. With reference to FIGS. 7-9, the object 300 can be a container. Furthermore, the object 300 can be fungible. Fungibility is common, for example, among plastic totes used in modern distribution centers. These totes are often made from molds in large quantities such that very little variation exists from one tote to another. As shown in FIGS. 8 and 9, the object 300 can define an object length 302, an object width 304, and an object height 306 perpendicular to one another. The object 300 can include a first wall 308 and a second wall 310 spaced apart from one another along the object length 302. Similarly, the object 300 can include a third wall 312 and a fourth wall 314 spaced apart from one another along the object width 304. The object 300 can further include a bottom portion 316 and a top portion 318 spaced apart from one another along the object height 306.

At the top portion 318, the object 300 can include a rim 320 defining an opening 321 through which the object 300 is configured to be loaded and unloaded. At the bottom portion 316, the object 300 can include a base 322 through which the object 300 is configured to contact a planar support surface (not shown) when the object 300 is placed upright on the planar support surface. In this state, the base 322 can define a base plane substantially parallel to the planar support surface. The object length 302 and object width 304 can be parallel to the base plane while the object height 306 is perpendicular to the base plane. The first and second walls 308, 310 can extend between the third and fourth walls 312, 314 along the object width 304. Similarly, the third and fourth walls 312, 314 can extend between the first and second walls 308, 310 along the object length 302. The first, second, third, and fourth walls 308, 310, 312, 314 can also extend upward from the base 322 and be circumferentially distributed by an angular increment about an axis parallel to the object height 306. Correspondingly, the object 300 can include corners 324 (individually identified as corners 324a-324d) directly between different respective pairs of the first, second, third, and fourth walls 308, 310, 312, 314. The corners 324a-324d can define a corner angle perpendicular to the planar support surface when the object 300 is in contact with the planar support surface via the base 322. In the illustrated case, the angular increment and the corner angle are 90 degrees. In other cases, a counterpart of the object 300 can have a different number of walls, a different angular increment, no angular increment (e.g., for a cylindrical object), more than one angular increment (e.g., for an asymmetrical object), etc. More generally, it should be understood that the object 300 is merely one example of an object compatible with at least some embodiments of the present technology. Counterparts of the object 300 can have a variety of suitable forms.

Figure 10:
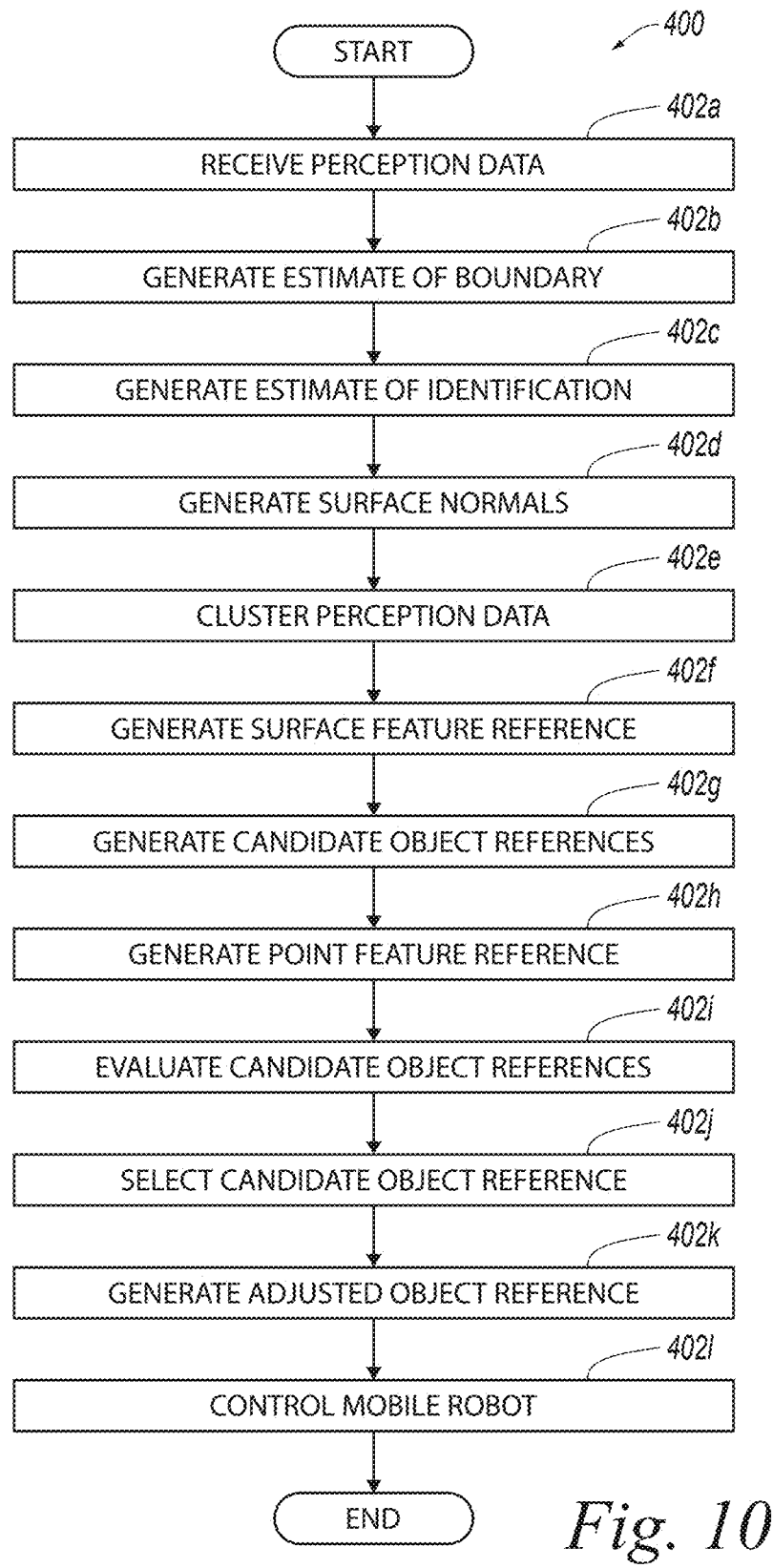
FIG. 10 is a block diagram depicting a method for generating an object reference from perception data in accordance with at least some embodiments of the present technology.
Figure 11:
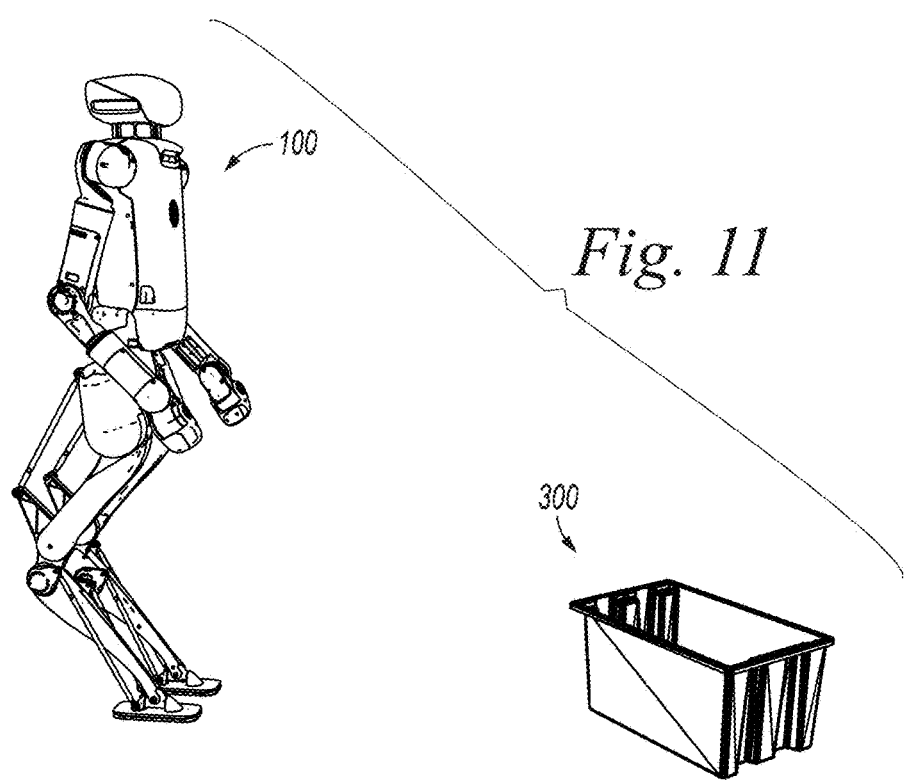
FIG. 11 is a perspective view of the robot of FIGS. 1-3 and the object of FIGS. 7-9 in an environment at a time during the method of FIG. 10 when the robot gathers perception data on the object.

FIG. 10 is a block diagram depicting a method 400 for generating an object reference from perception data in accordance with at least some embodiments of the present technology. The diagram includes blocks 402a-402l corresponding to different respective portions of the method 400. FIG. 11 is a perspective view of the robot 100 and the object 300 in an environment at a time during the method 400 when the robot 100 gathers perception data on the object 300. The object reference can correspond to a pose (e.g., a six degree of freedom pose) of the object 300 at this or at another suitable time. Similarly, operations of the method 400 associated with generating the object reference can occur by data-processing hardware of the system 177 at this or at another suitable time. Examples of times when the robot 100 may generate the object reference include immediately after the robot 100 first encounters the object 300, when the robot 100 first moves within a threshold proximity to the object 300, and when the robot 100 identifies the object 300 as a targeted object (e.g., based at least partially on an object identification from the neural network 258), among other examples. As shown in FIG. 11, the object 300 can be upright on a ground surface. Alternatively, the object 300 can be on an elevated support structure, such as a shelf, a table, etc. At least some embodiments of the present technology can facilitate generating a suitable reference for an object when the object is in an unstructured environment. An unstructured environment can be one in which no structure in the environment has a consistent and readily determinable spatial relationship with the object 300. In a structured environment, in contrast, a support structure may carry the object 300 in a way that allows a pose of the object 300 to be determined from a pose of the support structure. With reference again to FIG. 11, the robot 100 can face the object 300 at an angle with the feet 124a, 124b in contact with the ground surface of the environment.

Figure 12:
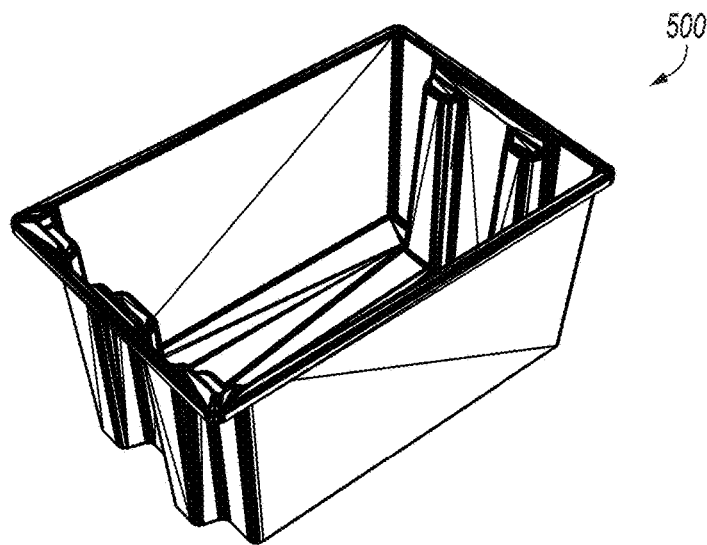
FIGS. 12 and 13 are representations of two-dimensional data and three-dimensional data, respectively, that the robot 100 gathers for the object of FIGS. 7-9 during the method of FIG. 10.
Figure 13:
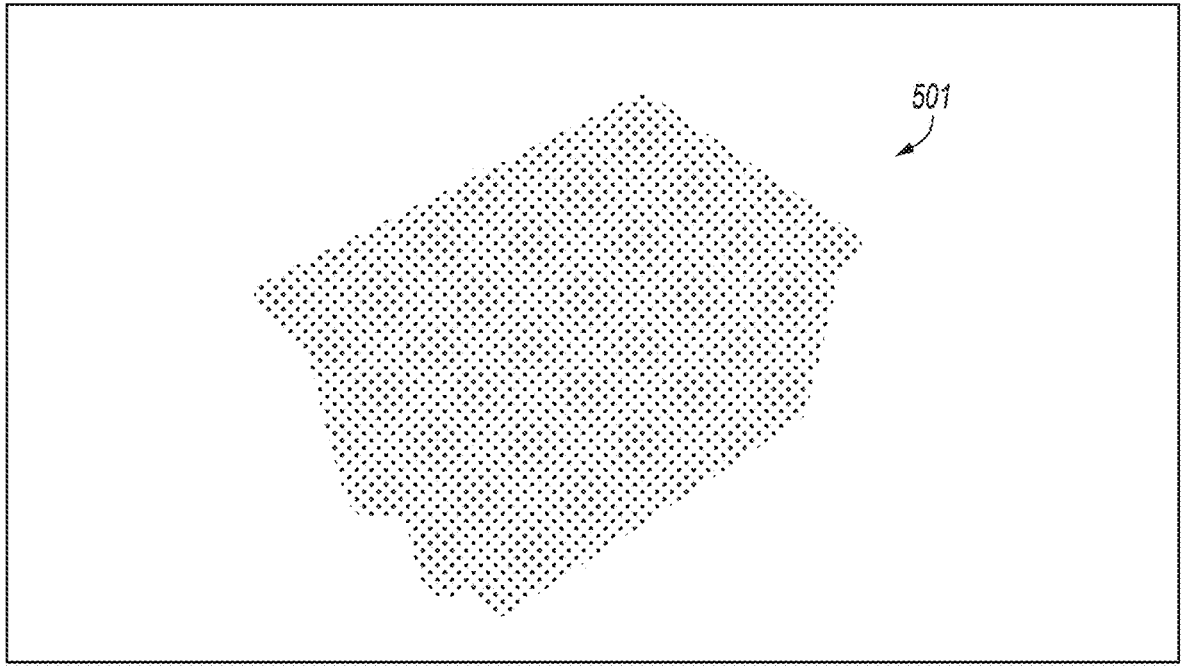
Figure 14:
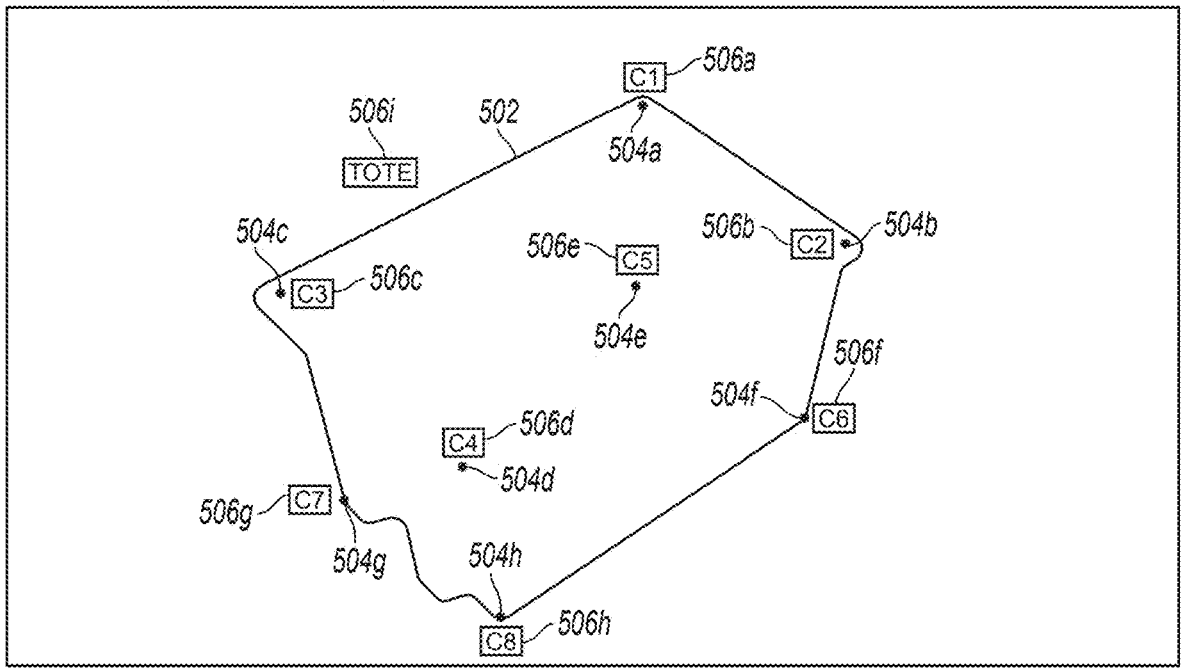
FIG. 14 is a representation of data processing associated with generating estimates corresponding to the object of FIGS. 7-9 during the method of FIG. 10.

Generating the object reference can include receiving perception data corresponding to the object 300 at data-processing hardware of the system 177 (block 402b). In at least some cases, the robot 100 receives the perception data via the sensor components 196, including via one or more of the two-dimensional sensors 250 and via one or more of the three-dimensional sensors 252. Furthermore, the robot 100 can receive the perception data at least primarily via one or more sensors at the sensor bays 117a, 117b, 117f, which have fields of view well suited to receiving perception data on objects in front of the robot 100. Alternatively or in addition, the robot 100 can receive the perception data via one or more sensors directed laterally or posteriorly. FIGS. 12 and 13 are representations of different types of perception data that the robot 100 can receive during the method 400. These representations correspond to the robot 100 and the object 300 as shown in FIG. 11 with the perception data gathered via sensors at the sensor bay 117a. In particular, FIG. 12 is a representation of two-dimensional data corresponding to the object 300 including image pixels 500. FIG. 14 is a representation of three-dimensional information corresponding to the object 300 including depth pixels 501. With additional reference to FIG. 6, the representations of FIGS. 12 and 13 can correspond to outputs of the two-dimensional data processor 254 and the three-dimensional data processor 256, respectively.

Figure 15:
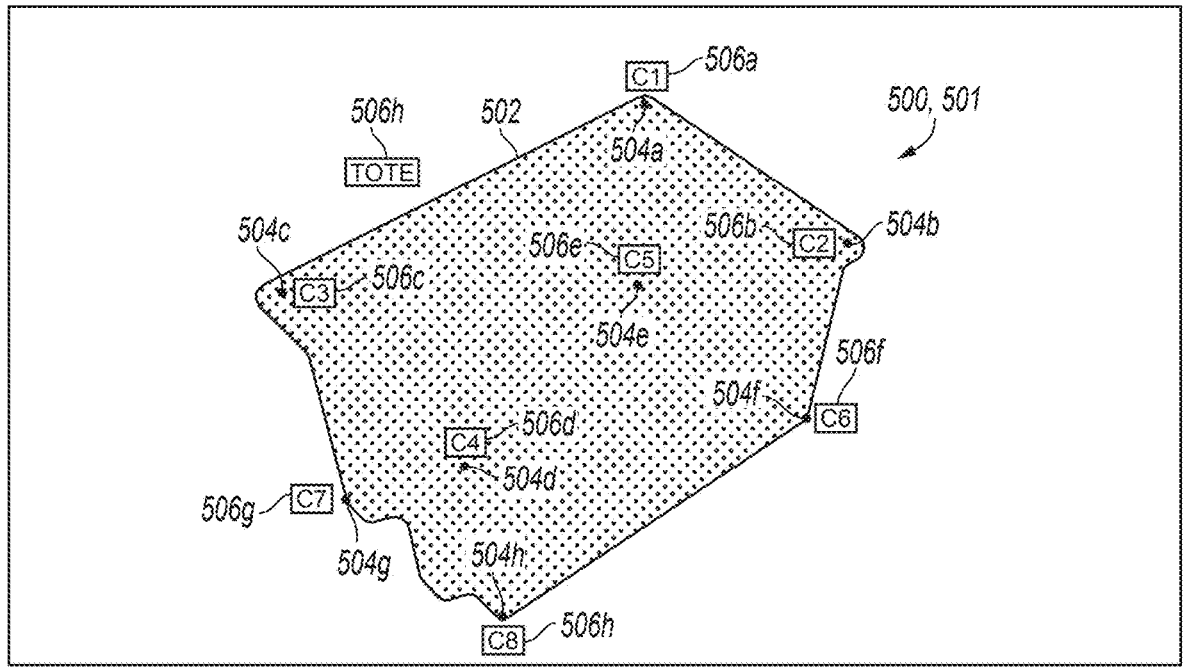
FIG. 15 is a representation of data processing associated with generating an annotated depth image corresponding to the object of FIGS. 7-9 during the method of FIG. 10.

The method 400 can further include processing the perception data. For example, the method 400 can include generating an estimate of a boundary of the object 300 (block 402b) and generating an estimate of an identification of the object 300 (block 402c). These estimates can be generated by the neural network 258 and can be based at least partially on the perception data. FIG. 14 is a representation of data processing associated with generating estimates corresponding to the object 300 during the method 400. In particular, FIG. 14 illustrates a boundary estimate 502, two-dimensional keypoint estimates 504 (individually identified as two-dimensional keypoint estimates 504a-504h), and label estimates 506 (individually identified as label estimates 506a-506i). The representation of FIG. 14 can correspond to an output of the neural network 258. FIG. 15 is a representation of data processing associated with generating an annotated depth image corresponding to the object 300 during the method 400. As shown in FIG. 15, the annotated depth image can include the image pixels 500, the depth pixels 501, the boundary estimate 502, the two-dimensional keypoint estimates 504, and the label estimates 506. The annotated depth image can correspond to an output of the depth image generator 260.

As discussed above, the object estimator 212 can generate two-dimensional keypoint estimates of the object 300 via the neural network 258 based at least partially on the perception data. In the context of the perception data and derivatives thereof shown in FIGS. 12-15, the two-dimensional keypoint estimate 504a corresponds to an inner, far, left, upper corner of the object 300, the two-dimensional keypoint estimate 504b corresponds to an inner, far, right, upper corner of the object 300, the two-dimensional keypoint estimate 504c corresponds to an inner, near, left, upper corner of the object 300, the two-dimensional keypoint estimate 504d corresponds to an inner, near, right, upper corner of the object 300, the two-dimensional keypoint estimate 504e corresponds to an inner, far, left, lower corner of the object 300, the two-dimensional keypoint estimate 504f corresponds to an inner, far, right, lower corner of the object 300, the two-dimensional keypoint estimate 504g corresponds to an outer, near, left, lower corner of the object 300, and the two-dimensional keypoint estimate 504h corresponds to an outer, near, right, lower corner of the object 300. Other two-dimensional keypoint estimates are also possible. For example, a counterpart of the neural network 258 can be trained to output two-dimensional keypoint estimates corresponding to object features other than corners, such as object markings, indentations, protrusions, etc. The label estimates 506a-506h correspond to the two-dimensional keypoint estimates 504a-504h, respectively. The label estimate 506i corresponds to an identification of the object 300.

The method 400 can further include generating surface normals corresponding to the perception data (block 402d). This can include comparing three-dimensional information for neighboring segments of the depth image. For example, when the three-dimensional information indicates that segments lie in a plane, the coordinates of the plane can specify the coordinates of the surface normals of interior portions of an approximately planar surface corresponding to the plane. The method 400 can also include clustering the perception data based at least partially on the surface normals (block 402e). In at least some cases, clustering the perception data based at least partially on the surface normals includes discarding clusters smaller than a threshold size. Next, the method 400 can include generating surface feature references (block 402f) based at least partially on the perception data. For example, generating surface feature references can be at least partially based on a result of clustering the perception data. Moreover, clustering the perception data and generating surface feature references can be based at least partially on the boundary estimate 502. For example, these operations can occur for perception data within the boundary estimate 502 while perception data outside the boundary estimate 502 is excluded.

Figure 16:
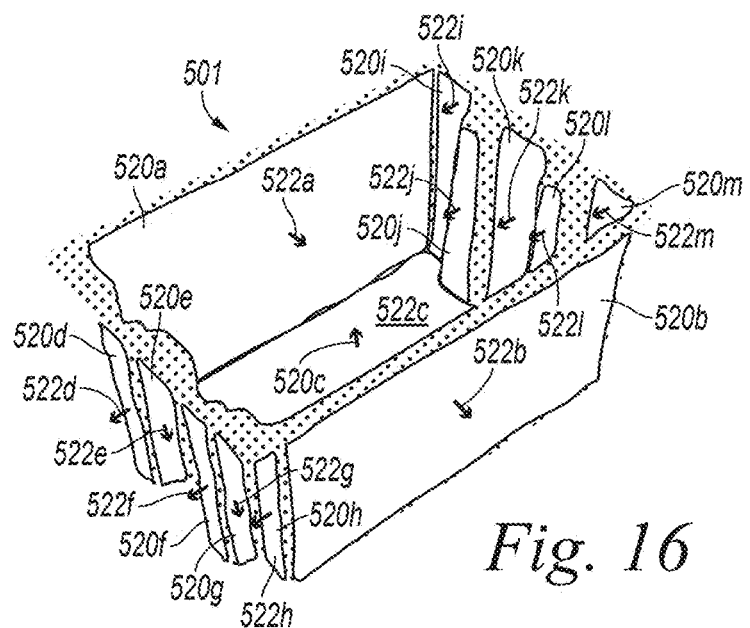
FIG. 16 is a representation of data processing associated with clustering perception data and generating surface feature references during the method of FIG. 10.

FIG. 16 is a representation of data processing associated with clustering perception data and generating surface feature references during the method 400. The surface feature reference generator 262 can process the depth pixels 501 to generate point clouds 520 (individually identified as point clouds 520a-520m) and corresponding surface normals 522 (individually identified as surface normals 522a-522m) based at least partially on a result of clustering the perception data. The point clouds 520a-520m and surface normals 522a-522m can correspond to surfaces of the object 300 or portions thereof. In the illustrated case, the point cloud 520a and the surface normal 522a correspond to a surface feature at the third wall 312. The point cloud 520b and the surface normal 522b correspond to a surface feature at the fourth wall 314. The point cloud 520c and the surface normal 522c correspond to a surface feature at the base 322. The point clouds 520d-520h and the surface normals 522d-522h correspond to a surface feature at the first wall 308. Finally, the point clouds 520i-520m and the surface normals 522i-522m correspond to a surface feature at the second wall 310. When surface normals of nearby point clouds are sufficiently similar, the corresponding point clouds can be grouped and classified as an approximately planar feature. In this or another suitable manner, the surface feature reference generator 262 can determine, for example, that the point clouds 520i-520m should be grouped to generate the same surface feature reference.

FIG. 17 is a representation of a first surface feature reference 530 generated during the method 400. The first surface feature reference 530 can include the point cloud 520a, a first plane 532, and a first surface feature centroid 534. Similarly, FIG. 18 is a representation of a second surface feature reference 540 generated during the method 400. The second surface feature reference 540 can include the point clouds 520i-520m, a second plane 542, and a second surface feature centroid 544. Generating the first surface feature reference 530 can include generating the first plane 532 and the first surface feature centroid 534 based at least partially on the point cloud 520a. Similarly, generating the second surface feature reference 540 can include generating the second plane 542 and the second surface feature centroid 544 based at least partially on the point clouds 520i-520m. Generating the first plane 532 can be via a plane fitting algorithm in which the point cloud 520a is an input. Similarly, generating the second plane 542 can be via the same or a different plane fitting algorithm in which the point clouds 520i-520m are inputs. Suitable plane fitting algorithms include random sample consensus algorithms. In at least some cases, the plane fitting algorithm discards outlier surface normals in a group corresponding to the same approximately planar feature, such as the surface normals 522e and 522g for a surface feature at the first wall 308. The first surface feature centroid 534 can be at an average width, average height, and average depth of the point cloud 520a with an orientation matching an orientation of the surface normal 522a. The second surface feature centroid 544 can be at an average width, average height, and average depth of the point clouds 520i-520m collectively with an orientation matching an average of the surface normals 522i-522m. As with the plane fitting algorithm, an algorithm for determining the first and second surface feature centroids 534, 544 can discard outlier surface normals in determining the surface feature centroid orientations.

Figure 19:
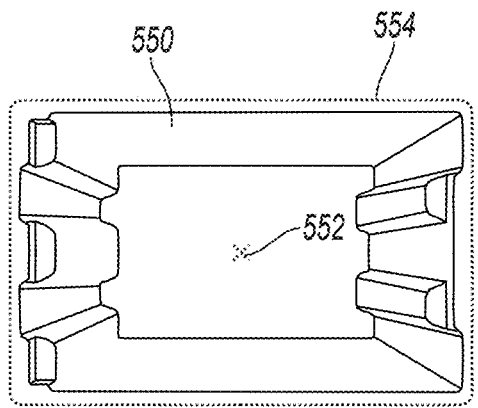
FIG. 19 is a top view representation of a model of the object of FIGS. 7-9 overlaid with a model centroid and a model outline.

The method 400 can further include generating candidate object references for the object 300 (block 402g). This can be based at least partially on different respective alignments between surface feature references corresponding to surface features of the object 300 and an object model corresponding to the object 300. FIG. 19 is a top view representation of an object model 550 corresponding to the object 300 overlaid with a model centroid 552 and a model outline 554. In at least some cases, generating the candidate object references includes selecting the object model 550. This selection can be based at least partially on an estimate of an identification of the object 300. For example, the method 400 can include selecting the object model 550 based at least partially on the label estimate 506*i*. Furthermore, the object model 550 can be selected from among different object models in the object model library 268 (FIG. 6). When the robot 100 is tasked with interacting with only one type of object, however, selecting the object model 550 may be unnecessary. In such cases, the robot 100 may automatically process perception data for an encountered object using the object model 550.

With reference again to the illustrated embodiments, the orientations of the surface feature references can inform the orientations of the candidate object references. Correspondingly, the method 400 can include generating the candidate object references to "snap" to or otherwise register to the corresponding surface feature references. For example, a candidate object reference based on the first surface feature reference 530 can be generated such that an orientation of a surface of the object model 550 proposed for correspondence with the first surface feature reference 530 matches an orientation of the first plane 532. Likewise, a surface normal of the surface of the object model 550 proposed for correspondence with the first surface feature reference 530 can match a surface normal of the first plane 532. Furthermore, alignments corresponding to the candidate object references can be relative to various portions of the surface feature references and the object model 550. For example, generating the candidate object references corresponding to the first surface feature reference 530 can be based at least partially on different respective alignments between the first surface feature centroid 534 and the model centroid 552. Similarly, generating the candidate object references corresponding to the second surface feature reference 540 can be based at least partially on different respective alignments between the second surface feature centroid 544 and the model centroid 552. Alternatively or in addition, the alignments can be relative to one or more other portions or derivatives of the surface feature references and the object model 550.

Generating candidate object references for the object 300 can include aligning the object model 550 with surface feature references corresponding to the object 300 at different respective rotational or positional offsets. These rotational or positional offsets can be based at least partially on a geometry of the object 300. For example, a suitable rotational offset for candidate object references corresponding to the object 300 can correspond to the angular increment and the corner angle discussed above in the context of FIGS. 7-9. As another example, a suitable positional offset for candidate object references corresponding to the object 300 can correspond to the object length 302 and the object width 304 discussed above in the context of FIGS. 7-9. In at least some cases, generating candidate object references for a given surface feature reference of the object 300 includes aligning the object model 550 with the surface feature reference at different respective combinations of one of two or more different positional offsets and one of three or more different rotational offsets. In these and other cases, the rotational offsets can differ from one another by an angular increment corresponding to the corner angle defined by the corners 324a-324d and the angular increment by which the first, second, third, and fourth walls 308, 310, 312, 314 are circumferentially distributed about the axis parallel to the object height 306. Furthermore, the angular increment between the rotational offsets can differ by no more than 10% (e.g., be the same as) the corner angle defined by the corners 324a-324d and the angular increment by which the first, second, third, and fourth walls 308, 310, 312, 314 are circumferentially distributed about the axis parallel to the object height 306. One of the positional offsets can correspond to the object length 302 and another to the object width 304. For example, one of the positional offsets can differ by no more than 10% (e.g., be the same as) the object length 302 while the other differs by no more than 10% (e.g., is the same as) the object width 304.

Figure 20:
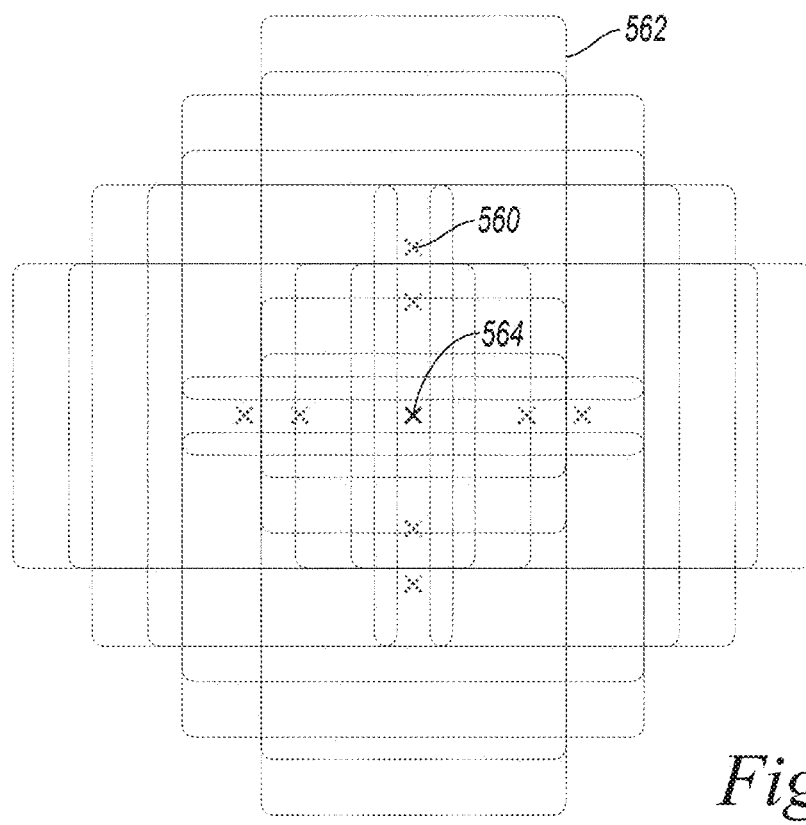
FIG. 20 is a representation of an array of candidate object reference centroids and candidate object reference outlines corresponding to different respective combinations of rotational and positional offsets for generating candidate object references during the method of FIG. 10.

FIG. 20 is a representation of an array of candidate object reference centroids 560 (one labeled) and candidate object reference outlines 562 (one labeled) corresponding to different respective combinations of rotational and positional offsets for generating candidate object references during the method 400. FIG. 20 also shows a pre-offset centroid 564. When generating candidate object references for a given surface feature reference, the pre-offset centroid 564 can have a position matching a position of the surface feature centroid of the surface feature reference and an orientation matching the orientation of the surface normal of the plane of the surface feature reference. From this position and orientation, a given pair of a candidate object reference centroid 560 and a candidate object reference outline 562 can correspond to a given pair of a rotational offset and a positional offset. The method 400 can include generating a candidate object reference for each of these pairs. In the illustrated case, the total number of candidate object references generated is 16. In other cases, a different number of candidate object references can be generated. For example, in the illustrated case, the set of candidate object references does not account for asymmetry of the object 300 about a plane bisecting and perpendicular to the object length 302. In another case, additional candidate object references can be generated to account for this asymmetry. The additional candidate object references can match the candidate object references corresponding to the candidate object reference centroids 560 and candidate object reference outlines 562 but with the object model flipped about the plane bisecting and perpendicular to the object length 302. Thus, the total number of candidate object references generated in this case would be 32.

Leveraging a geometry of an object to limit the number of candidate object references generated and evaluated can have advantages including decreasing the time and computing resources associated with determining an object reference from perception data on an object in an unstructured environment. This can be particularly useful in complex environments, such as in environments that call for simultaneously or near-simultaneously locating multiple objects, environments with moving objects, etc. In general, a set of possible object references for objects with smaller numbers of approximately planar sides (e.g., 3 or 4) and greater symmetry about axes parallel to their height can be fully specified with fewer candidate object references than for objects with greater numbers of approximately planar sides (e.g., 5 or more) and less symmetry about axes parallel to their height. For example, a set of possible object references for an object with exactly four equal sides can be fully specified from a surface feature reference with only four candidate object references. In contrast, a set of possible object references for the object 300 for which the object length 302 is greater than the object width 304 and there is asymmetry about the plane bisecting and perpendicular to the object length 302 is fully specified from a surface feature reference with 32 candidate object references.

The method 400 can further include generating a point feature reference (block 402*h*). A point feature reference for the object of 300 can be a pose including position and orientation information for a point feature of the object 300. The point feature can be one of the corners 324 or another feature (a marking, an indentation, a protrusion, etc.) of the object suitable for defining a point feature reference. As with generating a surface feature reference, generating a point feature reference can be based at least partially on perception data depicting the object 300. Moreover, generating a point feature reference can be based at least partially on perception data depicting the object 300 and at least one surface feature reference for the object 300. Furthermore, generating the point feature reference can include generating a keypoint estimate of a corresponding point feature of the object 300 via the neural network 258. The keypoint estimate can be one of the two-dimensional keypoint estimates 504 described above in connection with FIG. 14. In at least some cases, a level by which generating a point feature reference depends on output from the neural network 258 is greater than a level by which generating a surface feature reference depends on output from the neural network 258. This can be useful, for example, to reduce or eliminate error propagation in generating an object reference based on both a surface feature reference and a point feature reference. In other cases, however, generating a point feature reference and generating a surface feature reference are equally dependent on output from the neural network 258.

Figure 21:
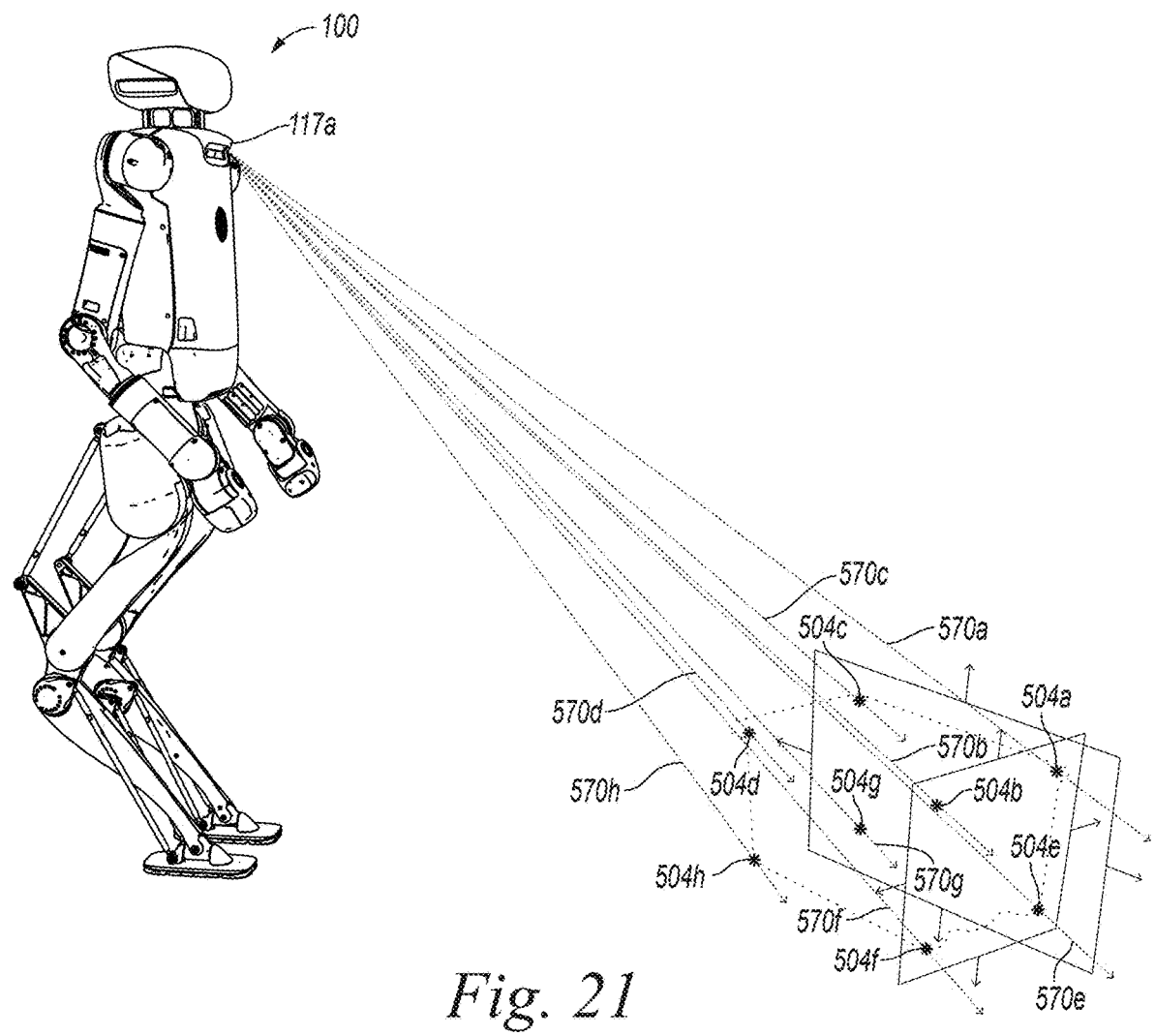
FIG. 21 is a perspective view of the robot of FIGS. 1-3 and the object of FIGS. 7-9 in the environment and at the time of FIG. 11 overlaid with a representation of data processing associated with generating point feature references during the method of FIG. 10.

FIG. 21 is a perspective view of the robot 100 and the object of 300 in the environment and at the time of FIG. 11 overlaid with a representation of data processing associated with generating point feature references during the method 400. In particular, FIG. 21 shows data processing associated with generating point feature references corresponding to both the first and second surface feature references 530, 540. Generating a point feature reference can include generating a ray based at least partially on a keypoint estimate and a reference frame of an image sensor of the robot 100. As shown in FIG. 21, data processing for generating point feature references for the object 300 can include generating rays 570 (individually identified as rays 570*a*-570*h*). The rays 570*a*-570*h* can extend between an image sensor at the elongate sensor bay 117*a* and the two-dimensional keypoint estimates 504*a*-504*h*, respectively. Generating point feature references corresponding to the two-dimensional keypoint estimates 504*a*-504*h* can be based at least partially on an intersection between a corresponding one of the rays 570*a*-570*h* and a plane of a corresponding surface feature reference or respective planes of multiple corresponding surface feature references. This intersection can locate the two-dimensional keypoint estimate 504*a*-504*h* in three-dimensional space and thereby convert the two-dimensional keypoint estimate 504*a*-504*h* into a point feature reference.

Figure 22:
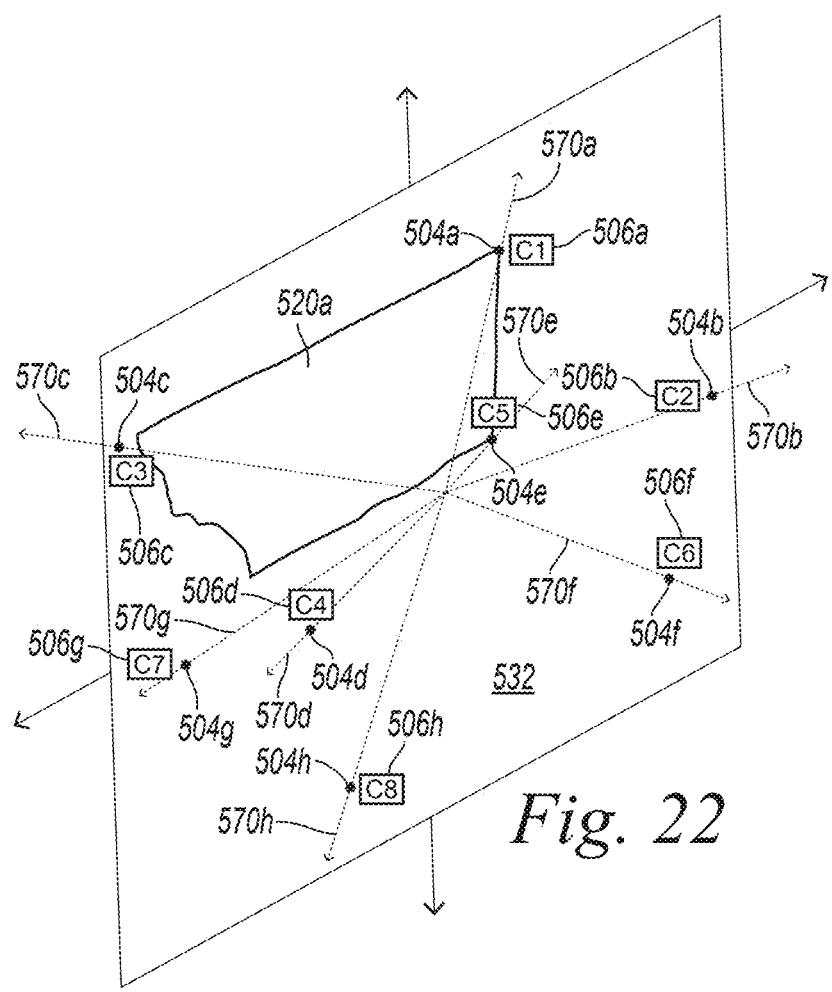
FIGS. 22 and 23 are further representations of data processing associated with generating point feature references during the method of FIG. 10.
Figure 23:
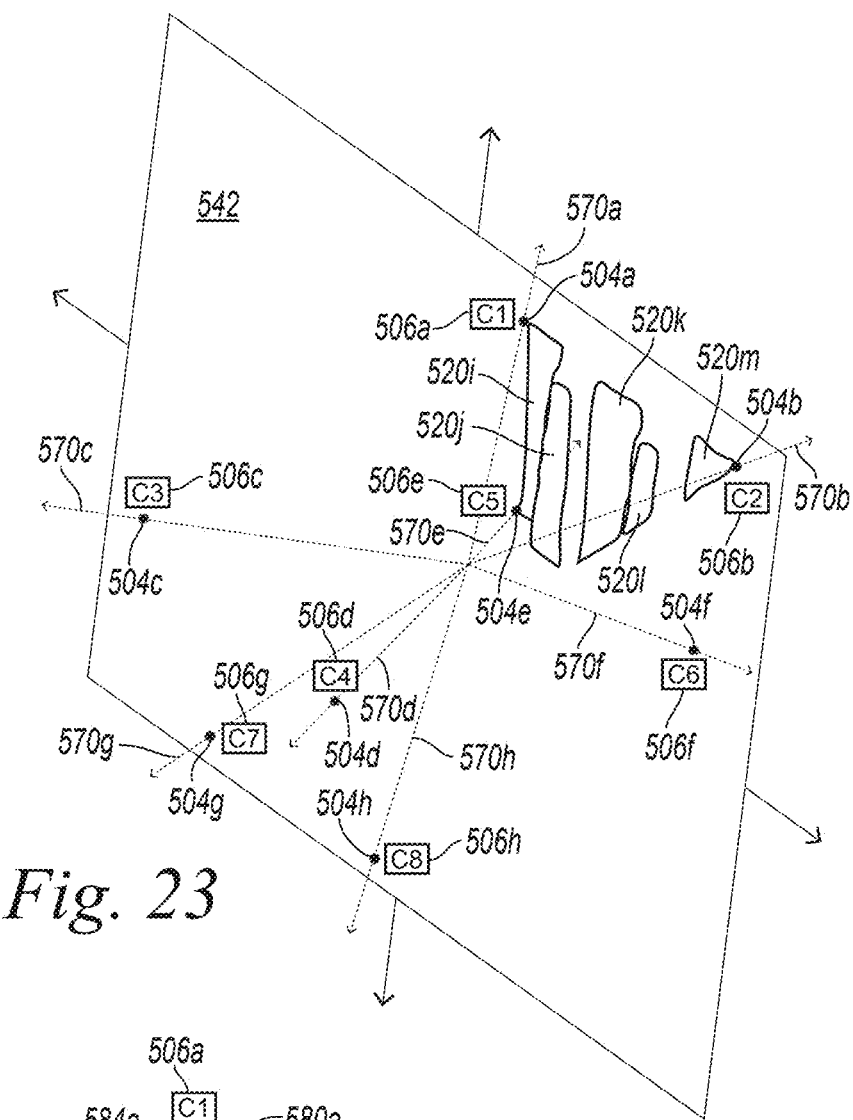

As a further refinement, generating a point feature reference can be based at least partially on a distance between the corresponding intersection and a point cloud of the corresponding surface feature reference(s). FIGS. 22 and 23 are further representations of data processing associated with generating point feature references during the method 400. In FIG. 22, the rays 570, the first surface feature reference 530, and the two-dimensional keypoint estimates 504 are shown from the perspective of the image sensor at the elongate sensor bay 117*a*. FIG. 23 is similar, but in the context of the second surface feature reference 540. As shown in FIGS. 22 and 23 the ray-to-plane intersections corresponding to the two-dimensional keypoint estimates 504*a*, 504*e* are very close to or touching the point cloud 520*a* of the first surface feature reference 530 and the consolidated area of the point clouds 504*i*-504*m* point clouds of the second surface feature reference 540. Based at least partially on these proximity relationships, the point feature reference generator 264 (FIG. 6) can determine that the intersections of the rays 570*a*, 570*e* and the first and second planes 532, 542 are correctly associated with the labels 506*a*, 506*e*. Correspondingly, the point feature reference generator 264 can discard intersections that are inconsistent with a configuration of the object 300. For example, the point feature reference generator 264 can determine that an intersection between the ray 570*h* and either of the first and second planes 532, 542 should be discarded. Other proximity relationships can be based on point clouds of surface feature references not shown in FIGS. 21-23, such as point clouds of surface feature references corresponding to surfaces of the first and fourth walls 308, 314 of the object 300.

Figure 24:
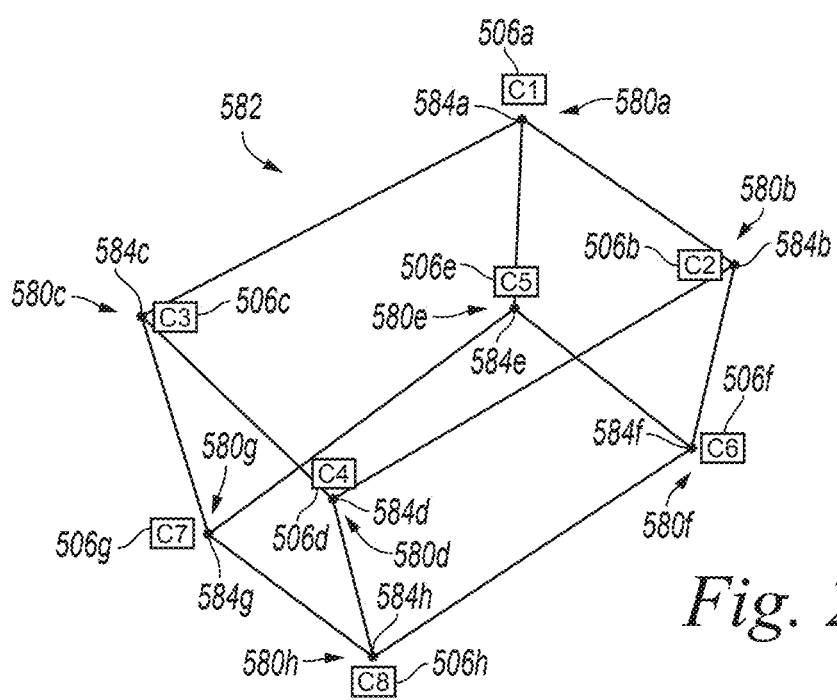
FIG. 24 is a representation of point feature references generated during the method of FIG. 10 interconnected to form an assembly of object wall primitives.

FIG. 24 is a representation of point feature references 580 (individually identified as point feature references 580*a*-580*h*) interconnected to form an assembly 582 of object wall primitives. The point feature references 580*a*-580*h* can include filtered intersections 584 (individually identified as filtered intersections 584*a*-584*h*) and corresponding labels 506*a*-506*h*. The assembly 582 can roughly correspond to a three-dimensional form of the object 300. The object estimator 212 can use one, some, or all of the point feature references 580*a*-580*h* to generate an object reference for the object 300. As shown in FIG. 10, the method 400 can include evaluating the candidate object references (block 402*i*) and selecting a candidate object reference (block 402*j*). The object estimator 212 can use one, some, or all of the point feature references 580*a*-580*h* in connection with the evaluation or selection. For example, the method 400 can include evaluating the candidate object references for accuracy and selecting one of the candidate object references based at least partially on a result of this evaluation. The point feature references 580*a*-580*h* can be sources of information for evaluating the accuracy of the candidate object references. For example, the candidate object reference evaluator 270 can implement a comparison algorithm including a cost function with the candidate object references and one, some, or all of the point feature references 580*a*-580*h* as inputs. The comparison algorithm can generate values that indicate how closely the individual candidate object references correspond to the point feature reference information. The candidate object reference evaluator 270 can then select the candidate object reference that most closely corresponds to the point feature reference information for use or further processing.

Figure 25:
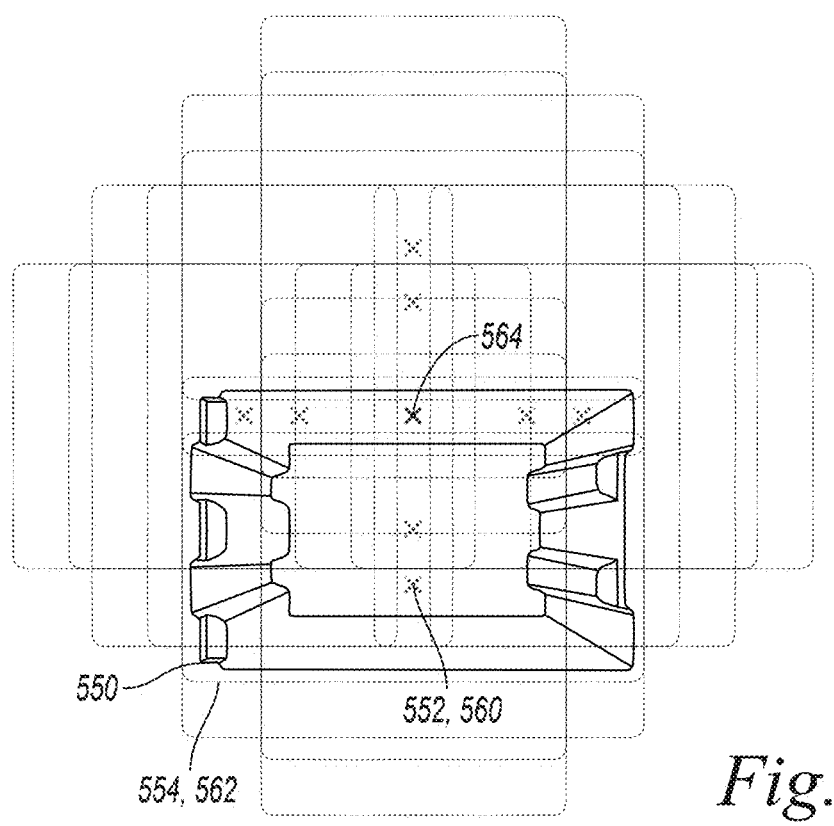
FIG. 25 is a representation of data processing associated with evaluating candidate object references corresponding to the first surface feature reference of FIG. 17 during the method of FIG. 10.
Figure 26:
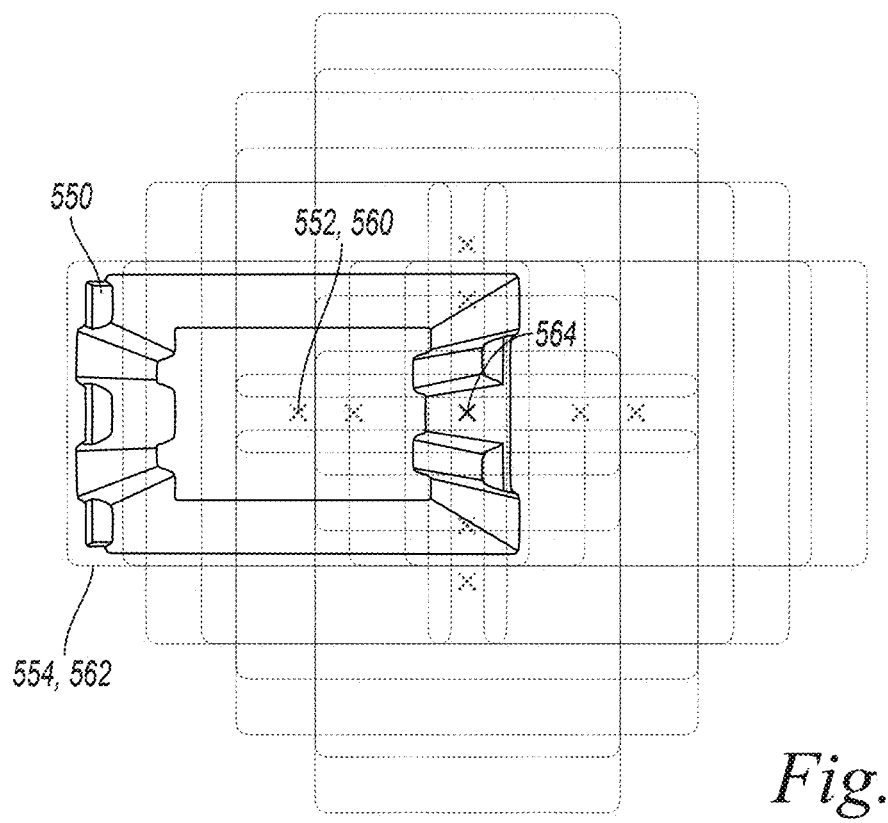
FIG. 26 is a representation of data processing associated with evaluating candidate object references corresponding to the second surface feature reference of FIG. 18 during the method of FIG. 10.

FIGS. 25 and 26 illustrate an example of evaluating candidate object references and selecting one of the candidate object references based on a result of this evaluation. In particular, FIG. 25 is a representation of data processing associated with evaluating candidate object references corresponding to the first surface feature reference 530. As shown in FIG. 25, the evaluation can indicate that the candidate object reference corresponding to the labeled candidate object reference centroid 560 and the labeled candidate object reference outline 562 most closely corresponds to the point feature reference information. The candidate object reference evaluator 270 can therefore select this candidate object reference for use or further processing. Similarly, FIG. 26 is a representation of data processing associated with evaluating candidate object references corresponding to the second surface feature reference 540. As shown in FIG. 26, the evaluation can indicate that the candidate object reference corresponding to the labeled candidate object reference centroid 560 and the labeled candidate object reference outline 562 most closely corresponds to the point feature reference information. The candidate object reference evaluator 270 can therefore select this candidate object reference for use or further processing. The candidate object reference evaluator 270 can select a candidate object reference for use after evaluating candidate object references corresponding to a single surface feature reference or after evaluating candidate object references corresponding to multiple surface feature references, such as most or all available surface feature references for a given object. In the latter case, the evaluation can occur simultaneously or in stages. For example, after selecting the most accurate candidate object reference corresponding to each the first and second surface feature references 530, 540, the candidate object reference evaluator 270 may compare the selected candidate object references to each other to generate a candidate object reference for use or further processing.

In some cases, a selected candidate object reference from the candidate object reference evaluator 270 may be accurate enough to use in controlling the robot 100. In these cases, the candidate object reference evaluator 270 can add the selected candidate object reference to the world state 213. Alternatively, the method 400 can include generating an adjusted object reference (block 402$k$) based at least partially on the selected candidate object reference. In at least some cases, the adjusted object reference generator 272 implements a matching algorithm, such as an iterative closest point algorithm, in which the selected candidate object reference and at least some of the point feature reference information are inputs. In these cases, the adjusted object reference generator 272 can add the adjusted object reference to the world state 213. Once updated, the object reference of the world state 213 can be available to the execution module 206 for use in controlling the robot 100. Correspondingly, the method 400 can include controlling the robot 100 (block 402$l$) based at least partially on the selected one of the candidate object references or the adjusted object reference.

Figure 27:
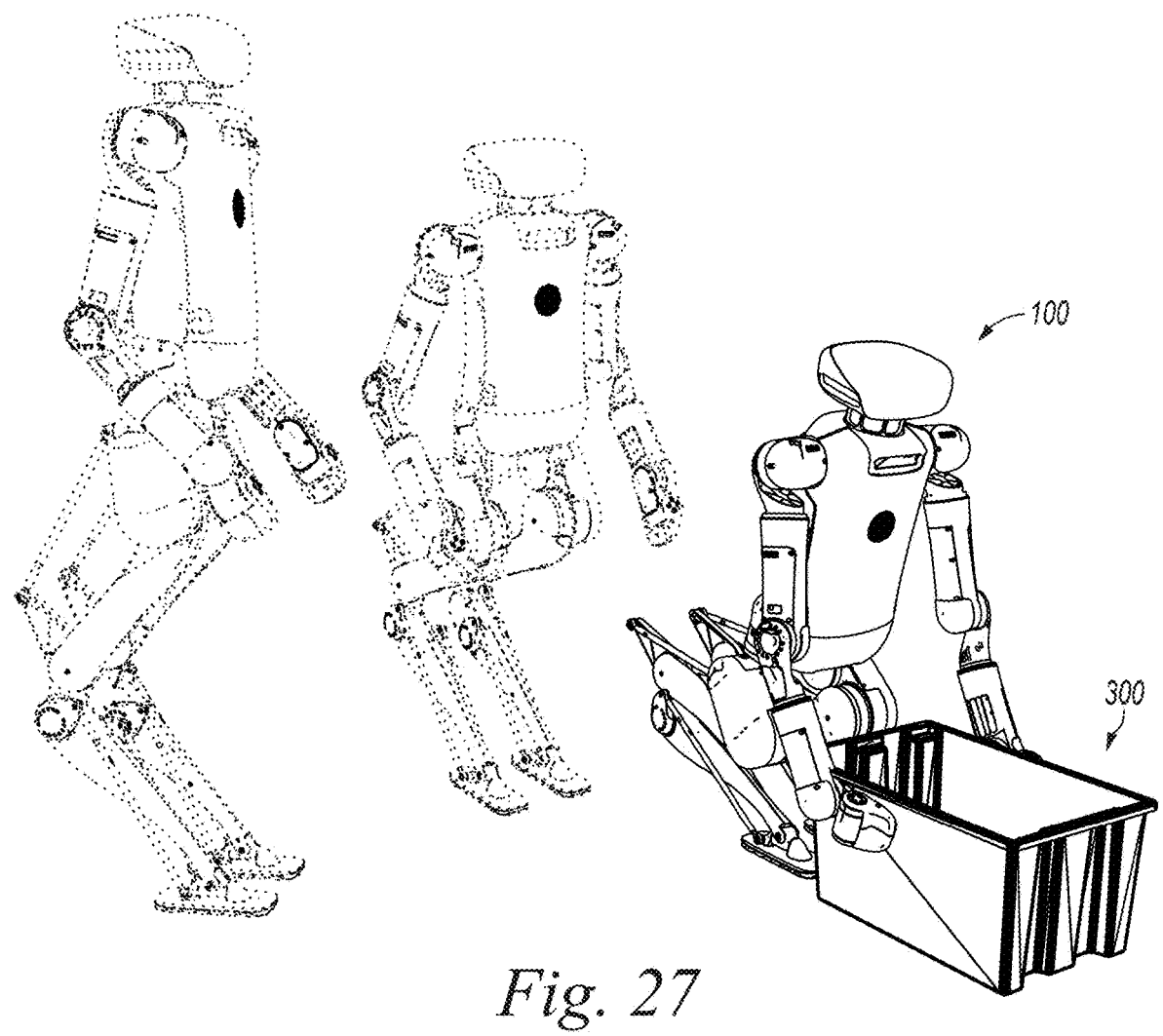
FIG. 27 is a perspective view of the robot of FIGS. 1-3 and the object of FIGS. 7-9 in the environment of FIG. 11 at a time during the method of FIG. 10 when the robot interacts with the object based at least partially on a result of processing perception data on the object.

FIG. 27 is a perspective view of the robot 100 and the object 300 at a time during the method 400 when the robot 100 interacts with the object 300 based at least partially on a result of processing perception data on the object 300. As shown in FIG. 27, controlling the robot 100 can include retrieving the object 300 from a starting location. This can occur by the robot 100 and can include contacting the object 300 and the end effectors 122$a$, 122$b$. In at least some cases, retrieving the object 300 includes moving the end effectors 122$a$, 122$b$ forward to be proximate to the third and fourth walls 312, 314 of the object 300, respectively, and then moving the end effectors 122$a$, 122$b$ toward one another and into contact with the object 300. Once the object 300 is sufficiently supported, the robot 100 can move joints of the arms 119$a$, 119$b$ and of the legs 120$a$, 120$b$ to lift the object 300. Of course, other processes for interacting with the object 300 based on an object reference are also possible, including processes that do not involve contacting the object 300. For example, the robot 100 may use an object reference to avoid a collision with the object 300 or to determine how another object should be positioned relative to the object 300, among numerous other examples.

Figure 28:
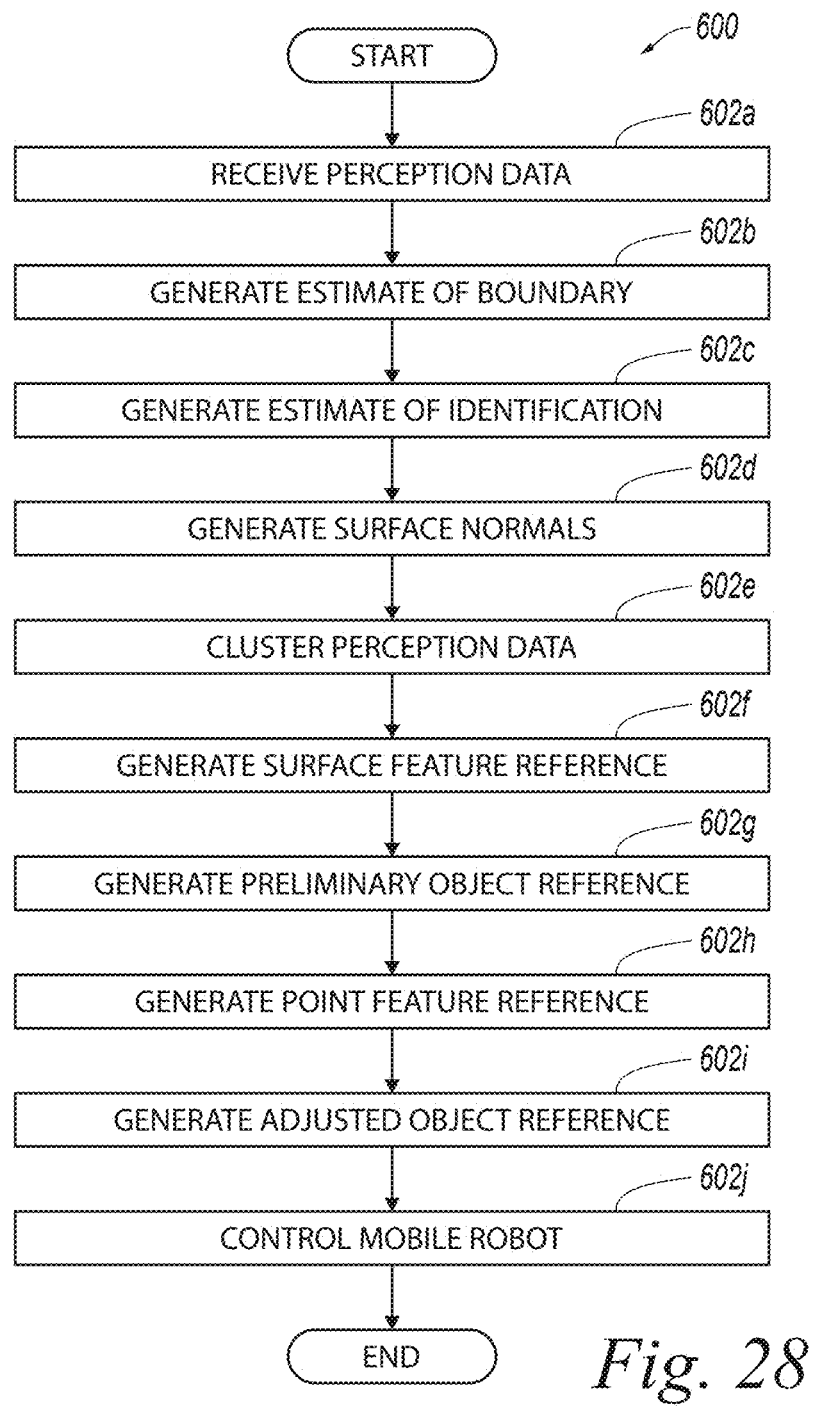
FIG. 28 is a block diagram depicting a method for generating an object reference from perception data in accordance with at least some embodiments of the present technology.

In the method 400, the object estimator 212 uses candidate object references to generate an object reference for use in controlling the robot 100. In other cases, methods in accordance with at least some embodiments of the present technology do not include using candidate object references. FIG. 28 is a block diagram depicting a method 600 for generating an object reference from perception data in accordance with at least some embodiments of the present technology that does not include use of candidate object references. The diagram includes blocks 602$a$-602$j$ corresponding to different respective portions of the method 600. Portions of the method 600 corresponding to blocks 602$a$-602$f$ and 602$h$-602$j$ can be the same as or similar to portions of the method 400 corresponding to blocks 402$a$-402$f$, 402$h$, 402$k$ and 402$l$, respectively. Rather than generating candidate object references, the method 600 can include generating a preliminary object reference (block 602$g$). In at least some cases, generating the preliminary object reference is similar to the process for generating candidate object references, but bypasses at least some associated operations. For example, a counterpart of the candidate object reference generator 266 and the candidate object reference evaluator 270 can implement a matching algorithm (e.g., an iterative closest point algorithm) with the object model and two or more surface feature references for the object 300 as inputs. The algorithm can iteratively adjust an alignment of the object model with the two or more surface feature references to generate an alignment that reduces or eliminates inconsistencies. The algorithm can output the preliminary object reference, which can then be used or subjected to further processing as discussed above for the selected candidate object reference in the method 400. Of course, the methods 400 and 600 are merely two examples. Many other examples of methods for generating object references from perception data in accordance with at least some embodiments of the present technology are also possible.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:
   receiving, at data-processing hardware operably associated with a mobile robot, perception data corresponding to an object in an environment of the mobile robot;
   generating, by the data-processing hardware and based at least partially on the perception data, a surface feature reference corresponding to a surface feature of the object;
   generating, by the data-processing hardware, a preliminary object reference for the object based at least partially on an alignment between the surface feature reference and a model of the object;
   generating, by the data-processing hardware and based at least partially on the perception data and the surface feature reference, a point feature reference corresponding to a point feature of the object;
   generating, by the data-processing hardware, an adjusted object reference for the object based at least partially on the preliminary object reference and the point feature reference; and
   controlling the mobile robot includes controlling the mobile robot based at least partially on the adjusted object reference.

2. The method of claim 1, wherein generating the adjusted object reference includes generating the adjusted object reference via a matching algorithm in which the point feature reference and the preliminary object reference are inputs.

3. The method of claim 2, wherein the matching algorithm is an iterative closest point algorithm.

4. The method of claim 1, wherein the point feature is at a corner of the object.

5. The method of claim 1, wherein:
   receiving the perception data includes receiving the perception data via an image sensor of the mobile robot;
   the surface feature reference includes a plane of the surface feature; and
   generating the point feature reference includes:
      generating a keypoint estimate of the point feature by a neural network of the data-processing hardware, and
      generating a ray based at least partially on the keypoint estimate and a reference frame of the image sensor, and
      generating the point feature reference based at least partially on an intersection between the ray and the plane of the surface feature reference.

6. The method of claim 5, wherein:
   the surface feature reference includes a point cloud; and
   generating the point feature reference includes generating the point feature reference based at least partially on a distance between the intersection and the point cloud.

7. The method of claim 1, wherein:
   the point feature is a first point feature;
   the point feature reference is a first point feature reference;
   the method further comprises generating, by the data-processing hardware and based at least partially on the perception data and the surface feature reference, a second point feature reference corresponding to a second point feature of the object; and
   generating the adjusted object reference includes generating the adjusted object reference based at least partially on the preliminary object reference, the first point feature reference, and the second point feature reference.

8. The method of claim 7, wherein:
   the surface feature is at a wall of the object; and
   the first and second point features are at opposite respective ends of the wall.

9. The method of claim 1, wherein controlling the mobile robot includes causing an end effector of the mobile robot to contact the object.

10. The method of claim 1, wherein:
   the object is a container defining an object height and an object length perpendicular to one another;
   the object includes a top portion and a bottom portion spaced apart from one another along the object height;

the top portion of the object includes a rim defining an opening through which the object is configured to be loaded and unloaded;
the object includes a first wall and a second wall spaced apart from one another along the object length; and
the surface feature is at one of the first and second walls.

11. The method of claim 1, wherein:
the surface feature reference includes a centroid; and
generating the preliminary object reference includes generating the preliminary object reference based at least partially on an alignment between the centroid of the surface feature and a centroid of the model of the object.

12. The method of claim 1, wherein generating the preliminary object reference includes aligning the model of the object with the surface feature reference at a positional offset.

13. The method of claim 12, wherein:
the object includes a base through which the object is configured to contact a planar support surface;
the object defines:
  an object height perpendicular to the planar support surface when the object is in contact with the planar support surface via the base, and
  an object length parallel to the planar support surface when the object is in contact with the planar support surface via the base;
the object includes:
  a first wall extending upward from the base when the object is in contact with the planar support surface via the base, and
  a second wall extending upward from the base and spaced apart from the first wall along the object length when the object is in contact with the planar support surface via the base;
the surface feature is at the first wall; and
the positional offset corresponds to the object length.

14. The method of claim 13, wherein the positional offset is within 10% of half the object length.

15. The method of claim 1, wherein:
the method further comprises generating, by a neural network of the data-processing hardware and based at least partially on the perception data, an estimate of a boundary of the object; and
generating the surface feature reference includes generating the surface feature reference based at least partially on the boundary.

16. The method of claim 1, further comprising:
generating, by the data-processing hardware, surface normals corresponding to the perception data; and
clustering, by the data-processing hardware, the perception data based at least partially on the surface normals,
wherein generating the surface feature reference includes generating the surface feature reference based at least partially on a result of clustering the perception data.

17. The method of claim 16, wherein clustering the perception data includes clustering the perception data via a Euclidean clustering algorithm.

18. The method of claim 16, wherein:
the surface feature reference includes a point cloud and a plane; and
generating the surface feature reference includes:
  generating the point cloud based at least partially on a result of clustering the perception data, and
  generating the plane via a plane fitting algorithm in which the point cloud is an input.

19. The method of claim 1, wherein:
the method further comprises generating, by a neural network of the data-processing hardware and based at least partially on the perception data, an estimate of an identification of the object; and
selecting, by the data-processing hardware and based at least partially on the estimate of the identification of the object, the model of the object from among different models in a library of the data-processing hardware.

* * * * *